US010872708B2

(12) United States Patent
Dey et al.

(10) Patent No.: US 10,872,708 B2
(45) Date of Patent: Dec. 22, 2020

(54) PHASE CONTRAST X-RAY INTERFEROMETRY

(71) Applicants: Joyoni Dey, Baton Rouge, LA (US); Narayan Bhusal, Baton Rouge, LA (US); Leslie Butler, Baton Rouge, LA (US); Jonathan P. Dowling, Baton Rouge, LA (US); Kyungmin Ham, Baton Rouge, LA (US); Varshni Singh, Baton Rouge, LA (US)

(72) Inventors: Joyoni Dey, Baton Rouge, LA (US); Narayan Bhusal, Baton Rouge, LA (US); Leslie Butler, Baton Rouge, LA (US); Jonathan P. Dowling, Baton Rouge, LA (US); Kyungmin Ham, Baton Rouge, LA (US); Varshni Singh, Baton Rouge, LA (US)

(73) Assignee: Board of Supervisors of Louisiana State University and Agricultural and Mechanical College, Baton Rouge, LA (US)

(*) Notice: Subject to any disclaimer, the term of this patent is extended or adjusted under 35 U.S.C. 154(b) by 6 days.

(21) Appl. No.: 16/044,111

(22) Filed: Jul. 24, 2018

(65) Prior Publication Data
US 2019/0027265 A1  Jan. 24, 2019

Related U.S. Application Data

(60) Provisional application No. 62/536,321, filed on Jul. 24, 2017.

(51) Int. Cl.
*G01N 23/00* (2006.01)
*G21K 1/06* (2006.01)
*G01N 23/041* (2018.01)

(52) U.S. Cl.
CPC .......... *G21K 1/067* (2013.01); *G01N 23/041* (2018.02); *G21K 1/06* (2013.01); *G21K 2207/005* (2013.01)

(58) Field of Classification Search
CPC .... G21K 1/067; G21K 1/06; G21K 2207/005; G21N 23/041
See application file for complete search history.

(56) References Cited

U.S. PATENT DOCUMENTS

2017/0319149 A1* 11/2017 Koehler ................. A61B 6/032

OTHER PUBLICATIONS

Berujon et al., "X-ray phase microscopy using the speckle tracking technique," *Applied Physics Letters* 102, 154105, 2013.
(Continued)

*Primary Examiner* — Dani Fox
(74) *Attorney, Agent, or Firm* — Venable LLP; Keith G. Haddaway

(57) ABSTRACT

A phase contrast X-ray imaging system includes: an illumination source adapted to illuminate a region of interest; a diffraction grating adapted to receive illumination from the illuminated region of interest, the diffraction grating comprising a spatial structure having a first periodicity superimposed with a second periodicity that is different from the first periodicity; and a detector adapted to detect illumination passing through the diffraction grating, wherein the spatial structure is defined by varying height and/or pitch, and wherein the spatial structure imparts a first phase dependence based on the first periodicity and an additional phase dependence based on the second periodicity on the illumination passing through the diffraction grating.

13 Claims, 26 Drawing Sheets

(56) References Cited

OTHER PUBLICATIONS

Chang et al., "Ultra-high aspect ratio high-resolution nanofabrication for hard X-ray diffractive optics," *Nature Communications*, Jun. 27, 2014.
Colonna et al., "Curved optics for X-ray phase contrast imaging by synchrotron radiation," *Phys. Med. Biol.*, 46, 967-974, 2001.
Cong et al., "Spherical grating based X-ray Talbot Interferometry," *Med Phys*, vol. 42, No. 11, pp. 6514-6519, Nov. 2015.
David et al., "Fabrication of diffraction gratings for hard X-ray phase contrast imaging," *Microelectronic Engineering*, vol. 84, 1172-1177, 2007.
Dey et al., "A Novel Phase Contrast System," presentation, IEEE NSS-MIC, Oct. 2017.
Duvauchelle et al., "A computer code to simulate X-ray imaging techniques," *Nuclear Instruments and Methods in Physics Research B*, vol. 170, pp. 245-258, 2000.
Goodman, Introduction to Fourier Optics, McGraw Hill, $2_{nd}$ Ed. 1988.
Kagias et al., "2D-Omnidirectional Hard-X-Ray Scattering Sensitivity in a Single Shot," Phys. Rev. Lett. 116, 093902, Mar. 3, 2016.
Miao et al., "Enhancing Tabletop X-Ray Phase Contrast Imaging with Nano-Fabrication", *Scientific Reports*, Aug. 2015, 5:13581, DOI: 10.1038/srep13581.
Miao et al., "A universal moiré effect and application in X-ray phase-contrast imaging," *Nature Physics* 12.9 (2016): 830.
Moitra et al., "Large-Scale All-Dielectric Metamaterial Perfect Reflectors," *ACS Photonics*, pp. 692-698, vol. 2, May 2015.
Momose, "Recent Advances in X-ray Phase Imaging," Japanese Journal of Applied Physics, vol. 44, No. 9A, 6355-6367, 2005.
Noda et al., "Fabrication of X-Ray Gratings Using X-Ray Lithography Technique for X-Ray Talbot Interferometer," *Journal of the Electrochemical Society*, 156 (5), H299-H302, 2009.
Peterzol et al., "X-ray phase contrast image simulation," *Nuclear Instruments and Methods in Physics Research B*, vol. 254, pp. 307-318, 2007.
Pfeiffer et al., "Phase retrieval and differential phase-contrast imaging with low-brilliance X-ray sources," *Nature Physics* vol. 2, Apr. 2006, (www.nature.com/naturephysics, published online: Mar. 26, 2006).
Sarapata et al., "High energy X-ray phase contrast CT using glancing-angle grating interferometers," *Medical Physics*, vol. 41, No. 2, Feb. 2014.
Thuring et al., "X-ray phase-contrast imaging at 100 keV on a conventional source," *Nature: Scientific Reports*, vol. 4, No. 5198, Jun. 2014.
Wang et al., "Analysis of polychromaticity effects in X-ray Talbot interferometer," *Anal Bioanal Chem*, 397, 2137-2141, 2010.
Weitkamp et al., "Tomography with grating interferometers at low-brilliance sources," Invited Paper, *Proc. of SPIE*, vol. 6318 63180S-5.
Weitkamp et al., "X-ray phase imaging with a grating interferometer," *Optics Express*, vol. 13, No. 16, pp. 6296-6304, Aug. 2005.
Wen, "A universal moiré effect and application to X-ray imaging," Presentation at LSU, Mar. 3, 2017.
Wen et al., "Theory of oblique and grazing incidence Talbot-Lau interferometers and demonstration in a compact source X-ray reflective interferometer," *Optics Express*, vol. 19, Nov. 25, 2011
Wu et al., "Clinical implementation of X-ray phase-contrast imaging: Theoretical foundations and design considerations," *Medical Physics* 30, 2169, 2003.
Wu et al., "A general theoretical formalism for X-ray phase contrast imaging," *Journal of X-Ray Science and Technology*, 11, 33-42, 2003.
Wu et al., "Phase-contrast X-ray tomography: Contrast mechanism and roles of phase retrieval,"*European Journal of Radiology* 68S, S8-S12, 2008.
Xu et al., "Two-dimensional single grating phase contrast system," Proc. SPIE 10573, Medical Imaging 2018: Physics of Medical Imaging, 1057323 (Mar. 9, 2018); doi: 10.1117/12.2292829; https://doi.org/10.1117/12.2292829.
Zanette et al., "Speckle-Based X-Ray Phase-Contrast and Dark-Field Imaging with a Laboratory Source," *Physics Review Letters*, vol. 112, 253903, Jun. 2014.

\* cited by examiner

PHASE CONTRAST X-RAY INTERFEROMETRY

CROSS-REFERENCE TO RELATED APPLICATION

This application claims priority to U.S. Provisional Application No. 62/536,321 filed Jul. 24, 2017, the entire content of which is hereby incorporated by reference.

BACKGROUND

1. Technical Field

The field of the currently claimed embodiments of this invention relates to X-ray imaging, and more particularly to phase contrast X-ray interferometry.

2. Discussion of Related Art

Conventional X-ray images the attenuation coefficient of materials and biological tissue. Phase-contrast X-ray adds two other aspects, using coherent X-ray: imaging the phase-shift and the scattering of X-ray imaging (dark-field). Whereas conventional X-ray imaging measures the attenuation coefficient of an object, phase contrast (PC) X-ray interferometry systems measure the real part of the refractive index of an object. This can thus be used for material science and non-destructive testing and medical imaging [1-25]. For medical imaging the real part of the refractive index lends significantly (~1000 times) higher soft-tissue (low-Z) contrast [3]. Two major directions of investigation that have made great strides are Talbot-Lau X-ray interferometry (ex. Pfeiffer et al., Nature Physics [1]), and more recently Far-Field interferometry (Miao et al., Nature Physics [4-5]).

Talbot-Lau X-ray interferometry has made inroads in high contrast phase and scatter imaging of different materials including animal soft-tissue [1-3]. The interferometry uses coherent X-ray beams passing through a phase-grating and an absorption grating. The X-ray beam after passing through the phase-grating generates an interference pattern which is ideally directly observed using high resolution (sub-micron) detectors. However to observe the patterns using a standard X-ray detector (of resolution 15-200 µm) poses a challenge. To overcome this, an absorption grating is used as an analyzer. This builds a slow-varying fringe pattern. From the intensity of the fringe pattern the object phase-shift can be derived. The fringes are a few pixels to a few tens of pixels wide in detectors of resolution 15-200 µm, easily discernable.

Phase-imaging: The change of the voxel-intensity pattern on the standard-detector with and without the object may then be used to calculate the phase of the object. With the object in the field the interference fringes are displaced and from the displacement the object-phase may be derived. The phase-shifts can be calculated in frequency domain, in a so called single-shot method. With the single-shot method, the phase of the object can be resolved at roughly the width of the fringe pattern (several pixels). To obtain the phase-image within pixel (or even sub-pixel) resolution, a phase-stepping method is used where the analyzer is moved in the transverse direction in several steps. To summarize, the single shot method yields lower resolution, while the phase-stepping yields higher resolution (pixel-level) but requires a higher dose due to multiple steps.

Dark-field imaging: The Talbot-Lau allows visualizing of scatterers of ~100 nm or less [26]. Scatterers larger than 100 nm will be hard to detect coherently. So called dark field imaging yields the scatter images. Typically the grating system or the object has to be rotated to obtain the scatter in all directions. A recent work of interest is Kagias et al. [24] where a 2D grating with a circular support is used to obtain omni-directional dark-field scatter. This is a single-shot technique in which the object or the grating system need not be rotated to obtain the dark field image. Hence, the system has dose advantage.

In [2], a curved detector was used for a hard X-ray (100 keV) Talbot-Lau interferometer. The circularly aligned structure helps to maximize the field-of-view [2]. In [25], grating functions bent in a spherical shape were used for Talbot-Lau interferometry. The radius of the spherical grating simulated in [25] was set to 800 mm. The phase grating had a periodic "on-off" comb structure of 4 µm with a duty cycle of 0.5 (transmission line width to period). The design parameters and purpose of the grating was to have increased field-of-view for Talbot-Lau interferometry.

Far-field interferometry was demonstrated in a recent Nature paper by Miao et al. [5]. Miao et al. [4, 5] showed a far-field system with two (or three) phase-gratings which can display a Moire-pattern of slow-varying interference fringes (superposed on the high-resolution interference pattern). The slow-varying component is directly visible on a standard (low-resolution) X-ray detector without the analyzer. This is a significant development allowing the fringe visualization on a standard detector (15-200 µm resolution), allowing phase contrast X-ray interferometry at about half the dose of the analyzer-based conventional Talbot-Lau interferometry [26].

Similar to Talbot-Lau interferometry, the phase can be obtained in single-shot mode (resolution is low, several pixels) or multi-shot phase-stepping to obtain pixel (or sub-pixel) resolution phase-imaging.

SUMMARY

According to some embodiments of the present disclosure, a phase contrast X-ray imaging system includes: an illumination source adapted to illuminate a region of interest; a diffraction grating adapted to receive illumination from the illuminated region of interest, the diffraction grating comprising a spatial structure having a first periodicity superimposed with a second periodicity that is different from the first periodicity; and a detector adapted to detect illumination passing through the diffraction grating, wherein the spatial structure is defined by varying height and/or pitch, and wherein the spatial structure imparts a first phase dependence based on the first periodicity and an additional phase dependence based on the second periodicity on the illumination passing through the diffraction grating.

According to some embodiments of the present disclosure, a method for performing phase contrast X-ray imaging includes: illuminating a region of interest; receiving illumination from the illuminated region of interest; imparting a first phase dependence and a second phase dependence to the received illumination using a single diffraction grating; and detecting the illumination imparted with the first and second phase dependence.

According to some embodiments of the present disclosure, a grating for performing phase contrast X-ray imaging includes: a support structure; and a plurality of grating elements arranged to receive an X-ray beam therethrough, wherein the grating is adapted to change the phase of the X-ray beam in a quadratic or spherical-cap form.

BRIEF DESCRIPTION OF THE DRAWINGS

Further objectives and advantages will become apparent from a consideration of the description, drawings, and examples.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

Phase contrast X-ray provides phase-shift and scatter information in addition to the attenuation coefficient of material provided by conventional X-ray. This has tremendous consequence for medical imaging, non-destructive testing, and material science. Particularly for soft-tissue imaging, the real part of the reflective index δ is about ~1000 times the imaginary part β (related to the attenuation), lending strong contrast between soft-tissue (that is typically not present in conventional X-ray imaging attenuation coefficient). Of the various interferometer techniques, the two at the forefront are far-field interferometry [5] and Talbot-Lau interferometry [1]. While the Talbot Lau interferometry has made significant progress, an absorption grating (analyzer) is needed to see interference patterns with standard cost-effective X-ray detectors, a requirement for medical application. The analyzer is detrimental from dose-consideration. Recently far-field X-ray [5] eliminated the need for the analyzer by using two (or three) phase-gratings with slight differences in pitch between them to create a "beat-frequency". The ensuing moire pattern fringes are visible with a standard detector.

Figure 10:
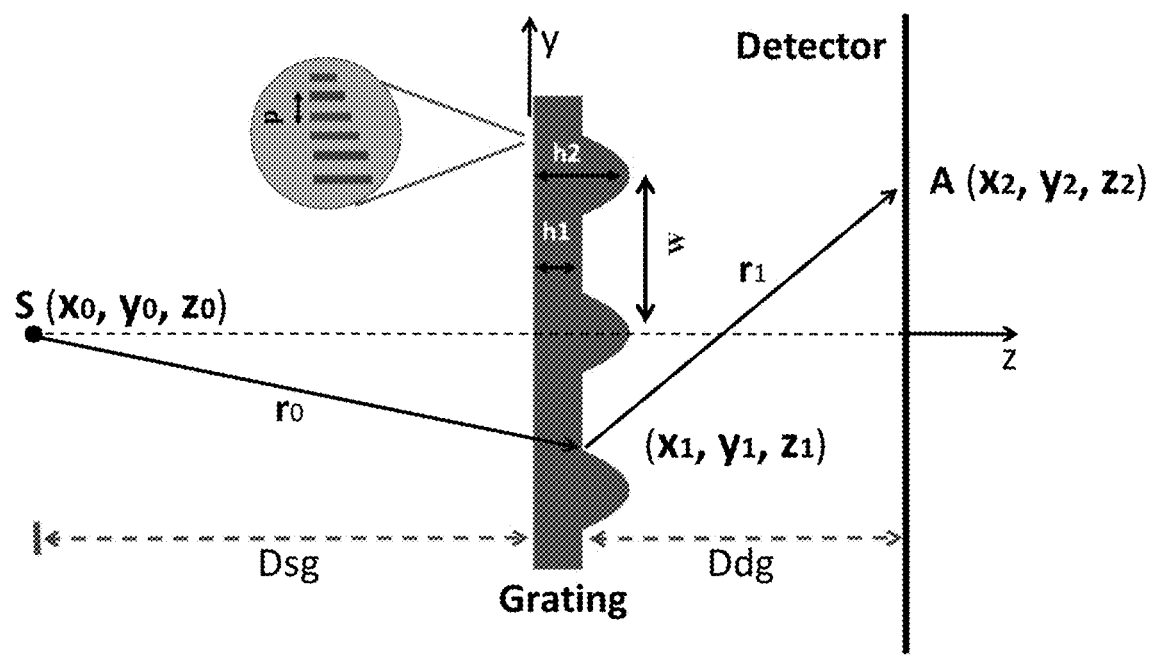
FIG. 10 shows the source, linear-quadratic grating, and detector (not relative to scale). The grating pitch P=500 nm. The peak-to-peak between slow-varying component is W=100-200 μm. The maximum heights h1 and h2 of the linear and linear-quadratic regions are such that they induce net-shifts of π/2 and π phase shifts respectively.

An interferometry system is disclosed herein that can achieve the same result as Miao et al. (*Nature Physics* 2015), using a single "chirp" grating (for example, FIG. 1A or a variation of FIG. 10). The grating function has a quadratic phase dependence which will provide a low-frequency intensity component. Other surface approximations such as spherical-cap surfaces may be possible. Sommerfeld-Rayleigh simulations of the interference carpet were performed. The simulations show the fringes first at 0.5 μm resolution. A slow varying component of the fringe patterns is observed at repeated distance intervals from the grating. The fringe patterns can be observed at 0.5 μm as well as on a lower-resolution 15 μm detector. At 15 μm the fringes are about 23 pixels wide (0.35 mm). The system described herein has some of the advantages of the NIH far-field system [4-5] over Talbot-Lau interferometry (such as no requirement of an analyzer grating to observe fringes with ordinary detectors, thus less dose, etc.) and needs just one grating function. Each prong of the chirp grating can follow the quadratic curve in height or can be approximated as a stepped version (FIG. 1A), i.e., each prong has a constant height, but the height changes quadratically from one prong to the next in steps. An on-off pattern, or "combs," can also be imposed (FIG. 10). The chirp gratings can lend themselves to 2D extensions with circular supports that can aid in single-shot dark-field imaging.

A grating is described herein which can change the phase of the X-ray beam in a quadratic (or paraboloid) form, proportional to a square of a transverse distance. Other forms such as sections of a sphere, oval, or rectangle may also be used. In paraboloid form the grating is best described as a "chirp-grating" with the phase varying as square of the distance. With a deliberate spatial dependence of phase, the following benefits are achieved. First, slow-varying components of interference patterns superposed on the fast-varying components are obtained to make the interference fringes visible in a low-resolution X-ray without using the absorptive analyzer. Second, since the chirp introduces a quadratic phase, at some distances the X-rays will interfere in phase in a curved surface, while others will be in a flat geometry. This allows a curved detector to be used (optionally), increasing the field of view (FOV) and fringe contrast, which is important for medical applications. Third, the 2D version of the grating can have a circular support and be useful for "single-shot" dark-field analysis, similar to the analysis done in [24]. The circular support ensures that scatterers in all directions are captured. The quadratic phase will ensure that the low-spatially varying fringes visible in a standard detector are superposed on the fast-varying interference field.

Figure 1A:
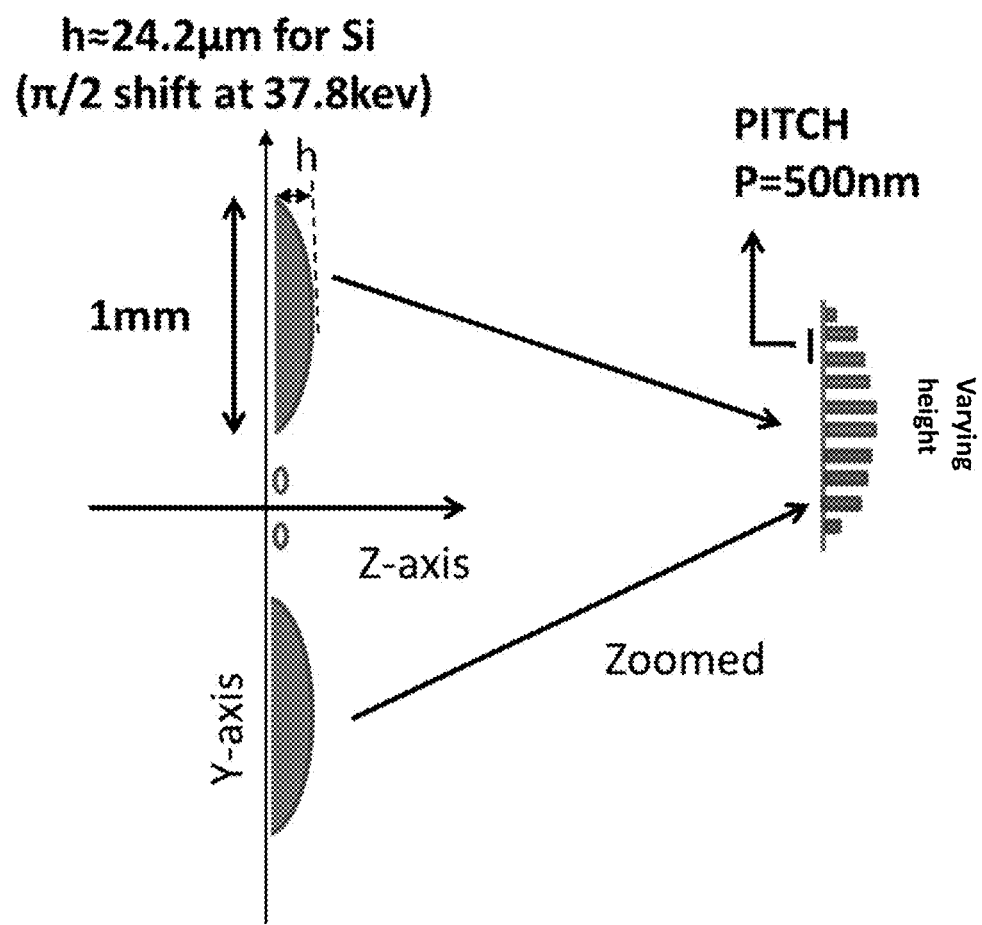
FIG. 1A shows a schematic diagram (not to relative scale) of an embodiment of the invention with some example dimensions for a discrete quadratic phase chirp-grating with spatially varying height.
Figure 1B:
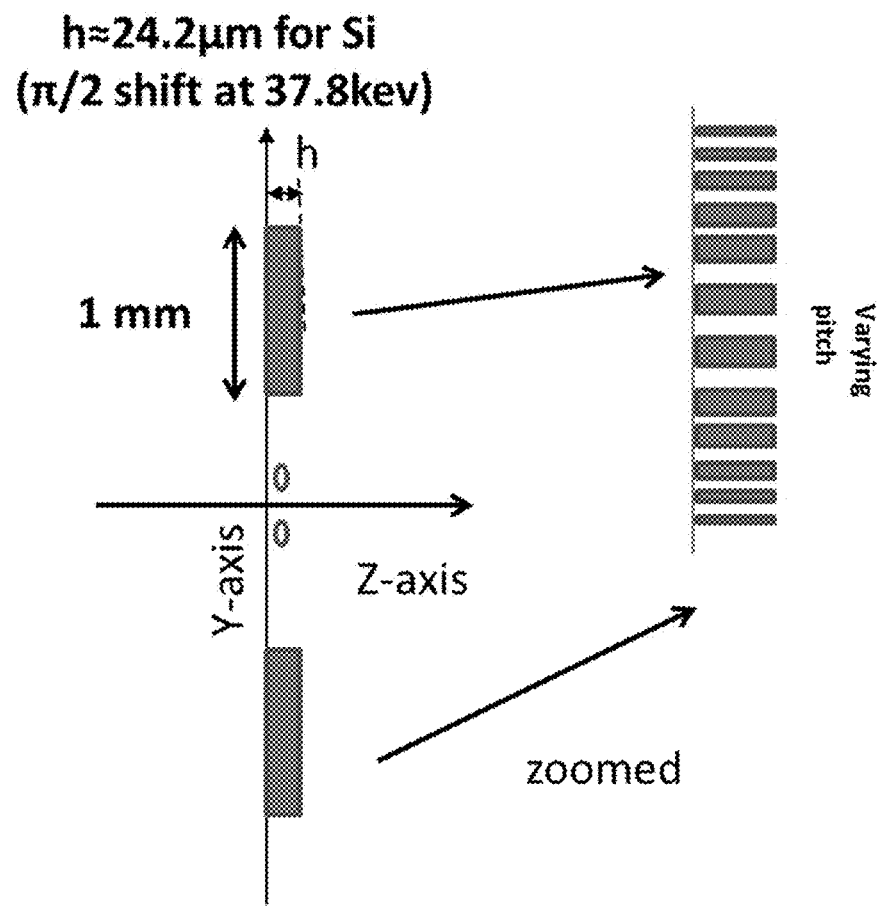
FIG. 1B shows a schematic diagram (not to relative scale) of an embodiment of the invention with some example dimensions for a varying pitch grating with constant height.

A schematic diagram of an embodiment of the grating is shown in FIG. 1A. The relative dimensions are not to scale (as the height is in microns and the spatial extent of each element is in mm). The pitch period is 500 nm. The key repeating element according to some embodiments has base-dimensions of 0.5-2 mm (ex. 0.75 mm) and the grating height (in direction of the beam propagation) varies from 0 to a maximum of π/2 or π shift. This would imply a few micron to a few 10 s of micron for common grating materials such as Au, Si, Cu or Ni. For a 37.8 keV X-ray beam, for example, the height of Si is approximately ~24.2 μm for a π/2 shift and ~48.4 μm for a π-shift. For Ni the heights are much less, only about ~6.59 μm and ~13.19 μm respectively for π/2 and π-shift. Other materials are tabulated at a later section. The "height" in FIG. 1A is along the z-axis, i.e., in the general direction of propagation of light from the source to the detector. As far as the extent in y is concerned, a large extent grating (1 to 20 cm) may be composed as in FIG. 1A by repeating the key quadratic element. FIG. 1A shows a key grating unit according to one embodiment. This is a discrete grating with pitch of 500 nm. The grating can also extend along the x-axis, such that the quadratic element has a hemisphere-like shape. FIG. 1B shows a variation in the design of the key element of the grating. For example, the grating can be designed as a varying pitch grating with constant height (FIG. 1B). In this "1-D" version, the curvature of the grating changes only in one direction. For the computer simulations the configuration of FIG. 1A was used with a pitch of 0.5 μm (or 500 nm).

Figure 1C:
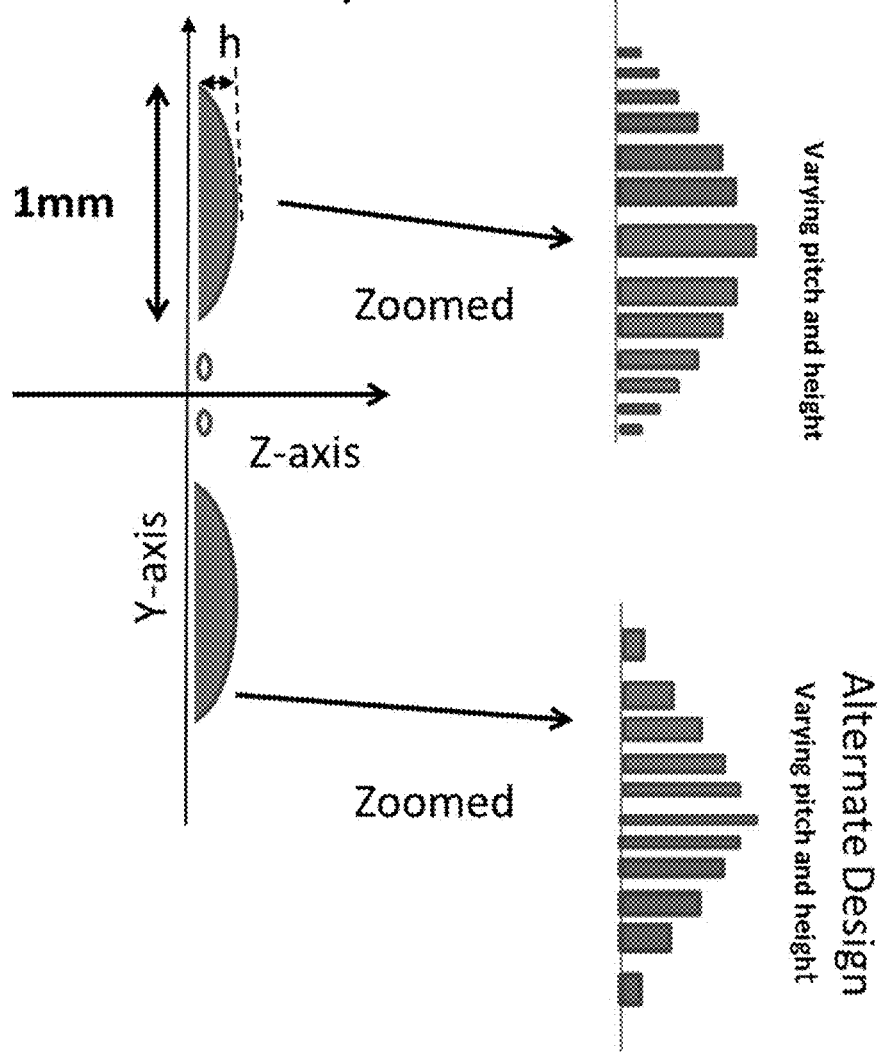
FIG. 1C shows a schematic diagram (not to relative scale) of an embodiment of the invention with some example dimensions for a grating with varying height and pitch.

A design difference from work Miao et al. [4, 5] is observed by considering the design in FIG. 1A. In Miao et al. [4, 5], the two linear gratings had pitches of a few 100 nm (400 nm and 399 nm) and a slow-varying beat frequency is achieved placing one after the other. For the present system in a case for similar pitch, the height of each element of the grating is changed in a quadratic manner. This achieves the slow-varying component for fringe visualization with a standard X-ray detector. Other instances of design differences from Miao et al. [4, 5] are observed by the method of spatially varying the pitch or varying both the height and the pitch, as shown in the examples in FIGS. 1B and 1C.

Figure 2:
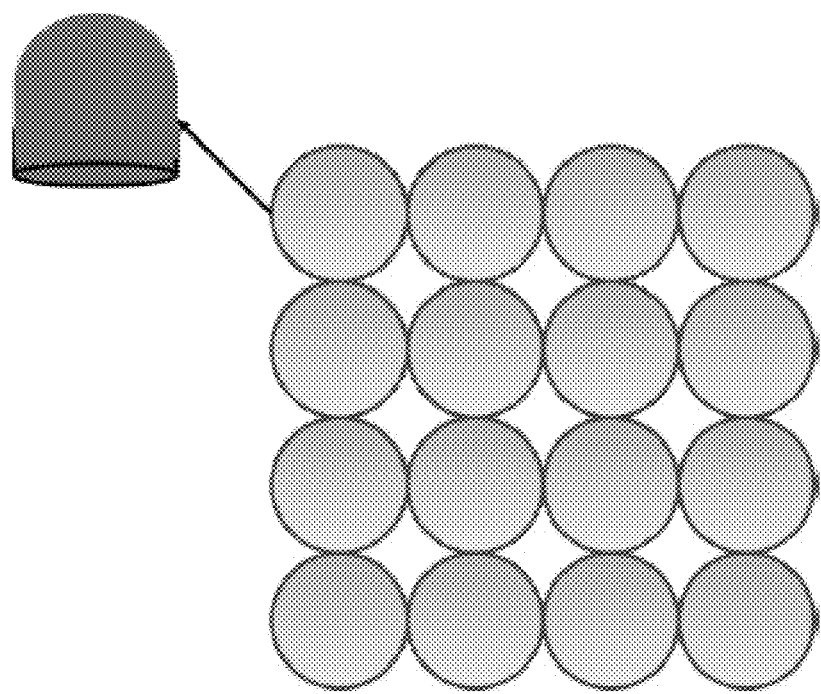
FIG. 2 shows a 2D grating arrangement including a quadratic surface with circular support. The elements may also be arranged in other patterns, such as hexagonal.

The grating pattern may be extended to a 2D-grating where 2D "paraboloid" (quadric surface) gratings with circular supports may be designed (see FIG. 2).

The phase contrast X-ray imaging system disclosed herein can be useful for "single-shot" dark-field analysis, similar to [24]. The circular support ensures scatterers in all directions are captured. The quadratic phase will ensure that the low-spatially varying fringes are superposed to the fast-varying interference field to enable visualization without the analyzer.

Figure 3A:
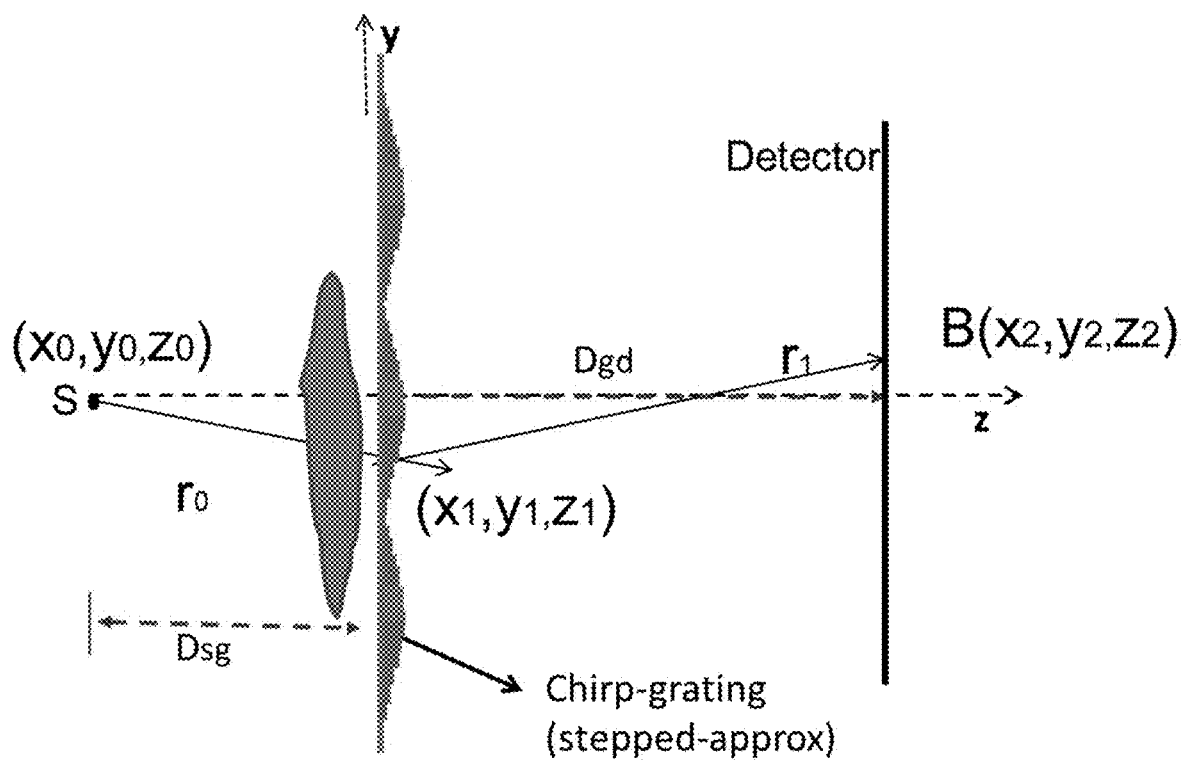
FIG. 3A shows a source, discrete chirp-grating, and flat detector.
Figure 3B:
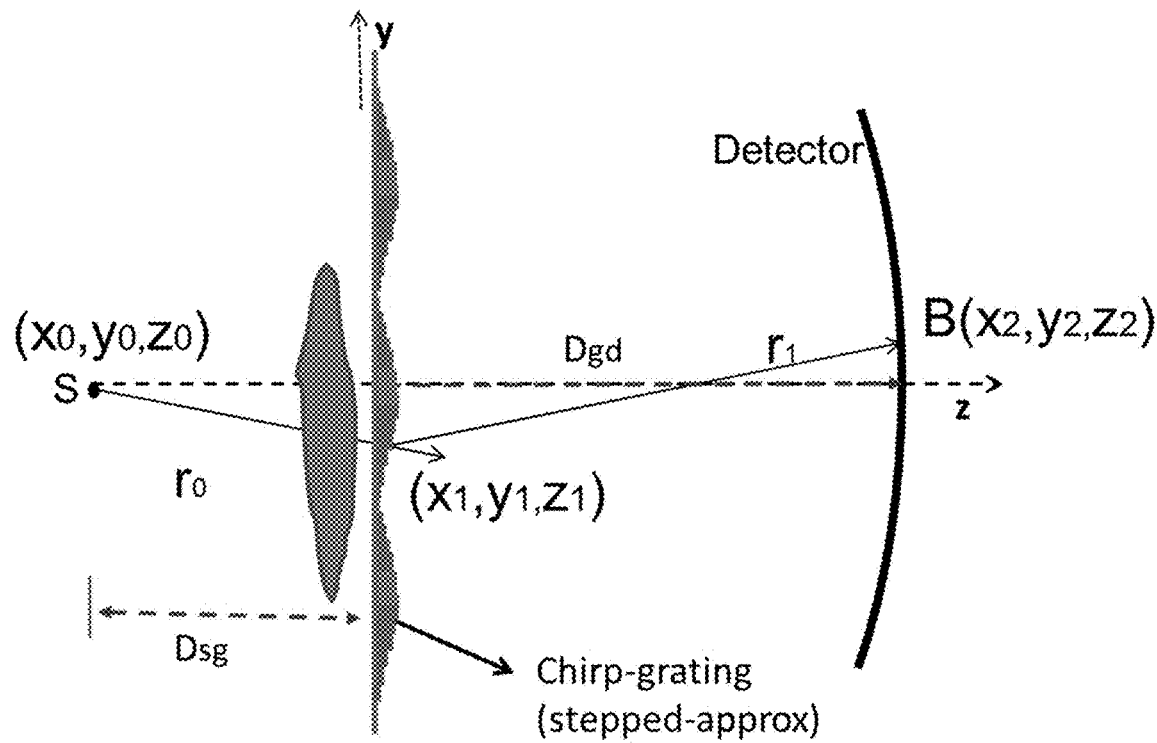
FIG. 3B shows a source, discrete chirp-grating, and curved detector.

FIGS. 3A and 3B show a setup for simulation of grating performance. In FIGS. 3A and 3B, the z-axis is the direction of propagation. The grating plane is in x-y. The Sommerfeld-Rayleigh diffraction integral equations are used to simulate (see Goodman [27] or Born & Wolfe [28]) the forward propagation of the X-ray beam and image formation. Refer to FIGS. 3A and 3B for the flat-detector and the curved-detector case, respectively. The general formation of the image with object is first considered, and then the image without object (the reference interference pattern) is considered. It is assumed that the chirp grating introduces a transmission and phase delay of the form $$G(x,y,z)=T_G(x,y,z)\exp(j\varphi_r(x,y,z)) \quad (1.1)$$

where $\varphi_r(x,y,z)$ is in the general form of a quadratic in x and y for a finite support which is then repeated. For the 1-D case, the quadratic dependence is on y for all x.

With the object with a transfer-function $T_O(x,y,z) \exp(j\phi_O(x,y,z))$ inserted together with the grating, the amplitude at the detector is given by $$B(x_2, y_2, z_2) = \quad (1.2)$$
$$\frac{1}{j\lambda}\int_G U(P_S)\frac{\exp(-jkr_0)}{r_0}G(x_1, y_1, z_1)\frac{\exp(-jkr_1)}{r_1}T_O(x,y,z)$$
$$\exp(j\phi_O(x,y,z))(\hat{r}_0 \cdot \hat{r}_1)dx_1 dy_1 dz_1$$

and the measured intensity is $$I(x_2,y_2,z_2)=|B(x_2,y_2,z_2)|^2 \quad (1.3)$$

Physically the function means that each point of the detector integrates the "Huygens" waves emitted at all the grating points.

Simulation of Reference Image

For the reference pattern, the object complex transfer function was set as 1, as it was desired to see the reference pattern without any object. The reference image was simulated with the parameters below. A monochromatic X-ray source is assumed at 37.8 keV. This corresponds to the current beamline energy at the Louisiana State University Center for Advanced Microstructures and Device (CAMD). The transmission is approximately 1 for the Si dimensions and attenuation through Si at these energies. The grating is simulated as a phase quadratic function of y, with phase going from 0 to $\pi/2$ µm and then back to zero. The grating phase function is sampled in 0.5 µm (y-direction sampling). This amounts to a discrete grating in FIG. 1A. Different materials will have different maximum heights. For example, at the maximum height of 24.2 µm, Si will provide a $\pi/2$ shift of the X-ray beam at 37.8 keV. The total width (extent) of each grating element (along the y direction) was 0.75 mm. Four grating elements were simulated for a total of 3 mm grating width (along the y direction). The distance of source to grating $D_{sg}$=50 cm (0.5 m). The intensity is then calculated with Eqns. 1.2 and 1.3, for all distances 24.5 cm to 25 cm from the grating, in steps of 0.5 µm. In the y-direction the interference pattern was simulated for 5 mm in steps of 0.5 µm. Thus, 100 million intensity values were calculated in y-z plane, shown in FIG. 4A. The simulation was done on an HPC cluster on multiple nodes.

Figure 4A:
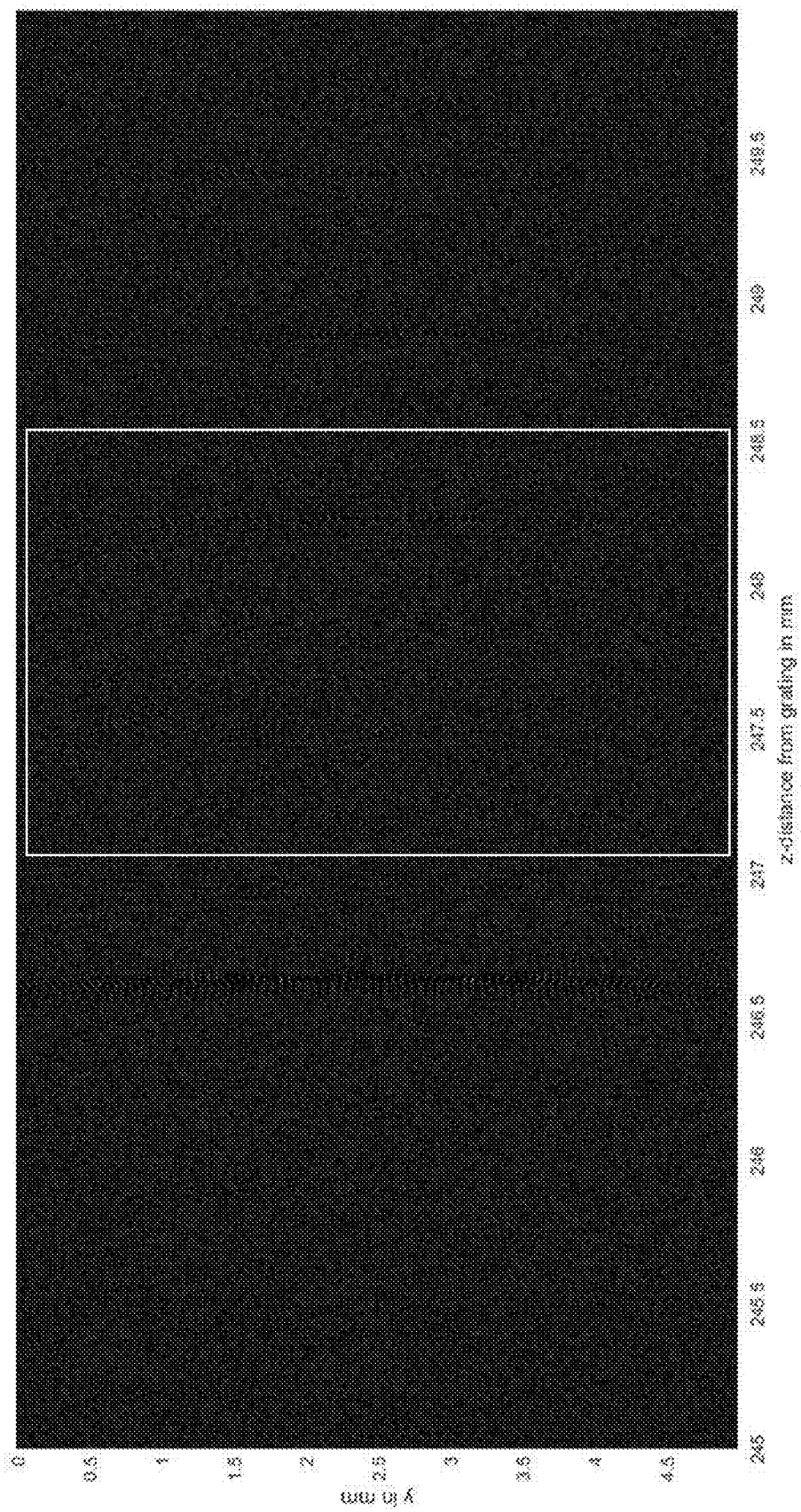
FIG. 4A shows the entire interference pattern 24.5 cm to 25 cm from the phase grating in steps of 0.5 μm (10,000 lines).
Figure 4B:
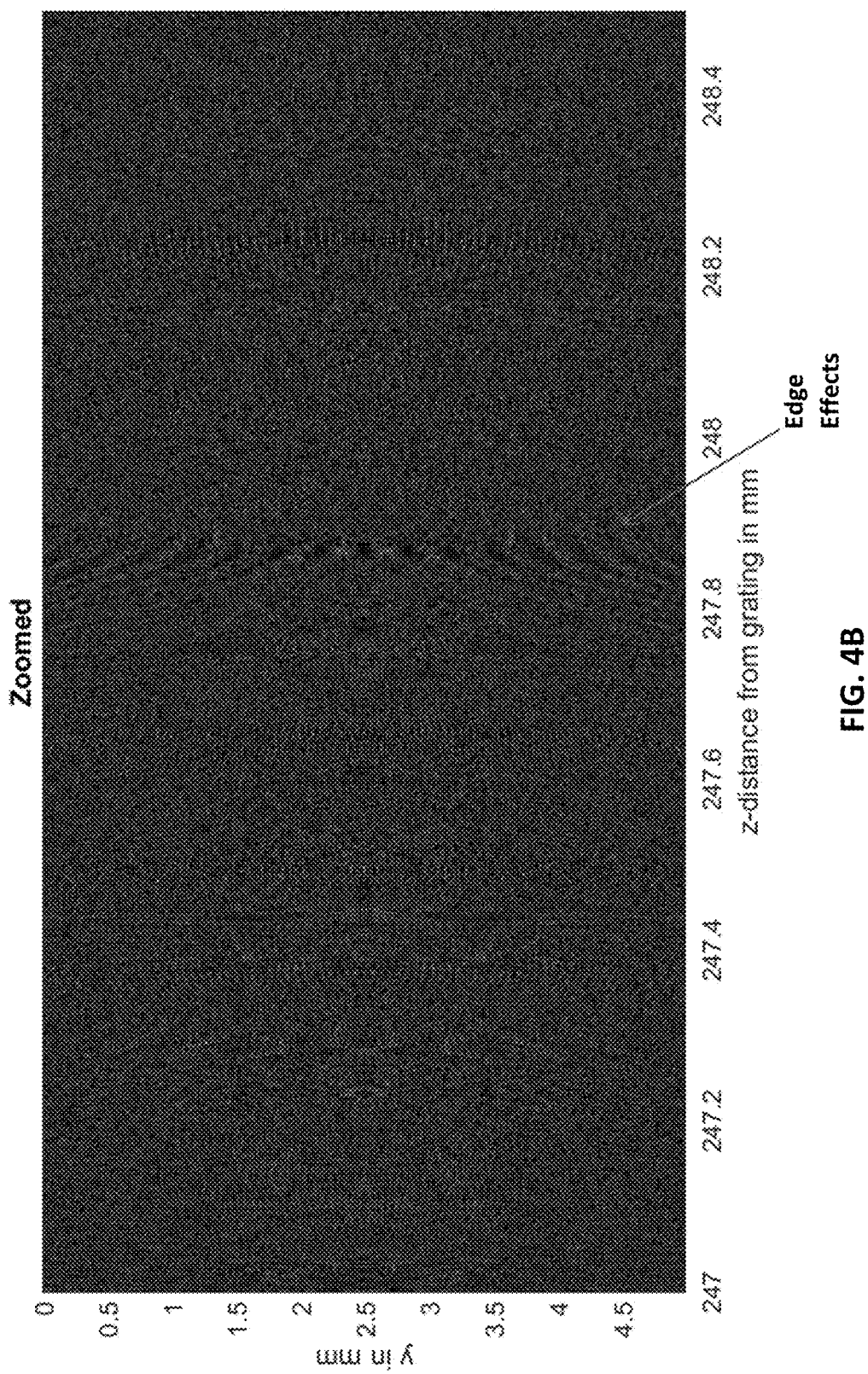
FIG. 4B shows the interference pattern of FIG. 4A zoomed into the section of interest indicated by the white box in FIG. 4A. The edge-effects are due to the extent of the grating (4×0.75 mm) 6 mm with respect to the "detected" intensities (y-direction total of 5 mm).
Figure 9:
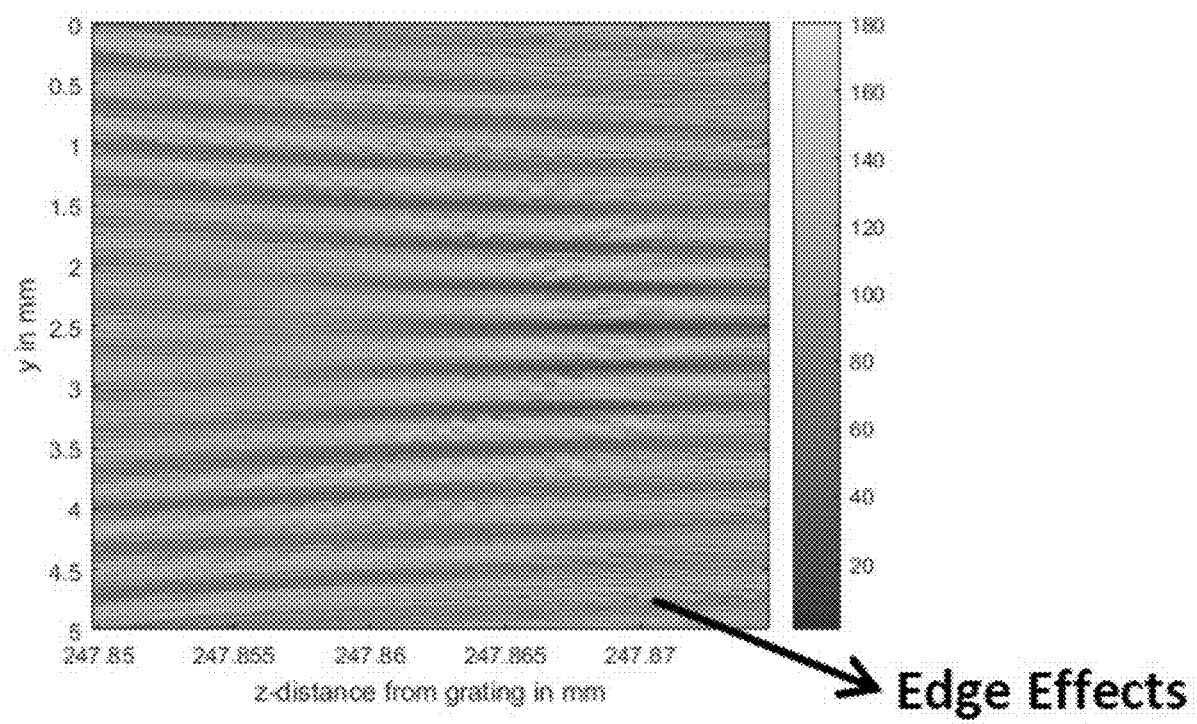
FIG. 9 shows an interference pattern showing high visibility fringe at y=2.5, z=247.87 detected with 15 μm detector broadening.

FIGS. 4A-4C, 5A, and 5B show simulation results. FIG. 4A shows the 100 million points of the interference "carpet" for a 5 mm distance between 24.5 and 25 cm from the grating. To visualize better, a section of the pattern of interest is taken from the region indicated by a white box and displayed in FIGS. 4B and 4C with increasing zoom. The slow-varying fringe patterns are clearly visible in FIG. 4C. The envelope function of the interference carpet is shown in FIG. 9 for better visibility.

Figure 4C:
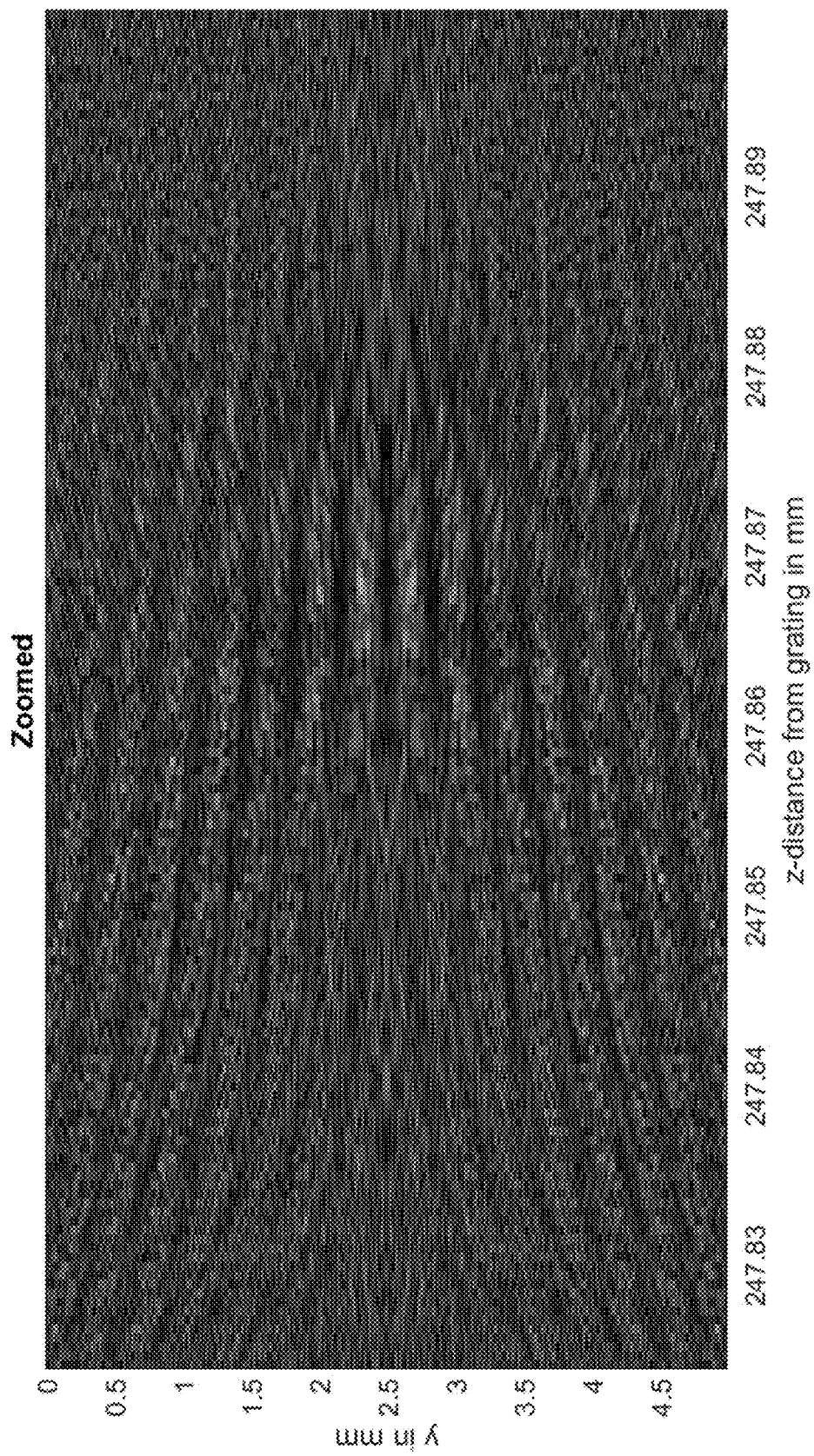
FIG. 4C shows the interference carpet zoomed further into the section of interest.
Figure 5A:
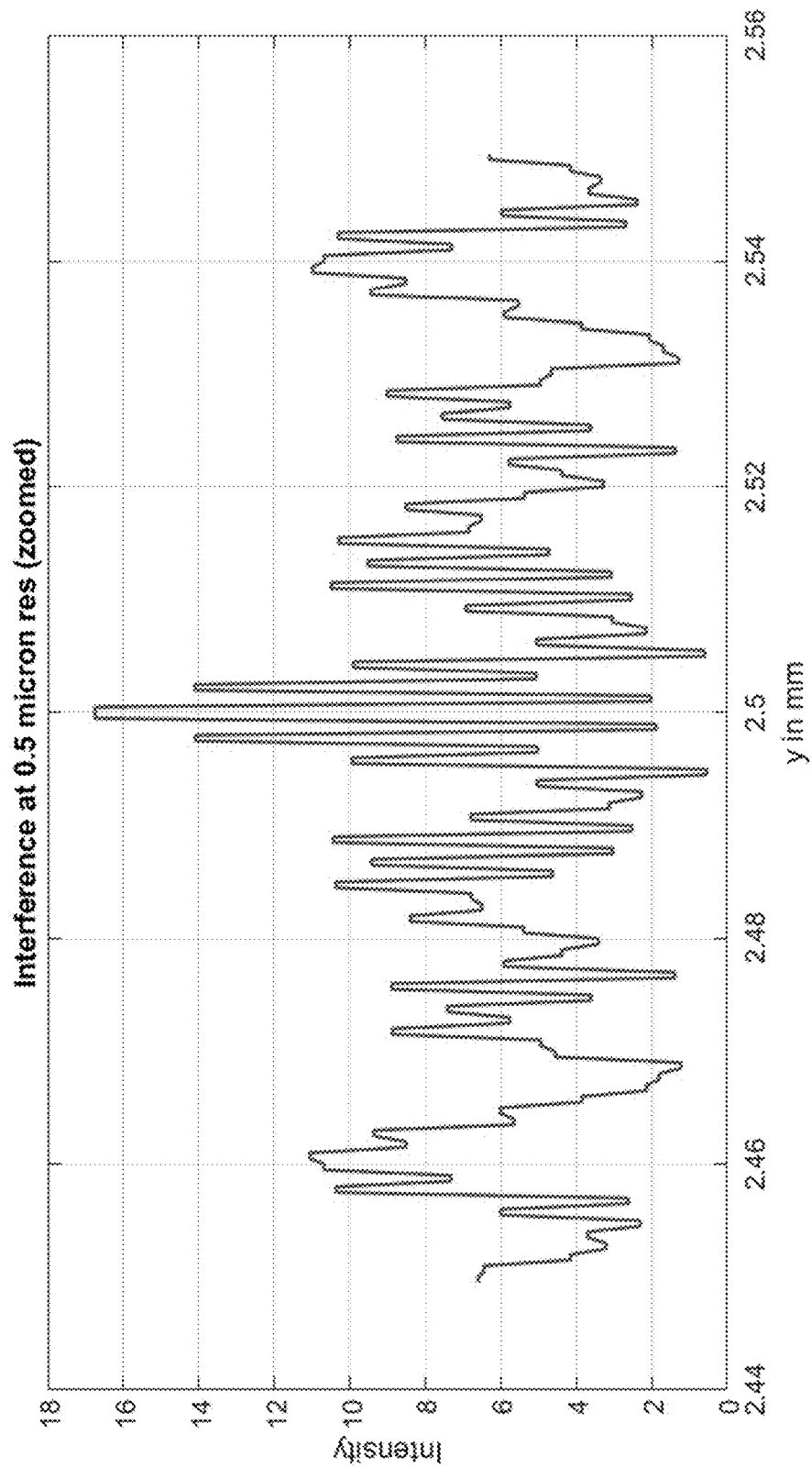
FIG. 5A shows an example interference line-pattern at 0.5 μm resolution from the carpet (in FIG. 4B). The plot shows intensity along the y-axis of the geometry (FIGS. 3A, 3B). A zoomed section at the center (few microns) is shown for clarity at this resolution.

FIG. 5A shows an extracted line from around ~247.86 mm of the pattern at FIG. 4C. This is displayed at 0.5 µm. Since at this resolution thousands of pixels will have to be displayed for the full 5 mm, the line is shown only for a few microns around the center of y (2.5 mm).

Figure 5B:
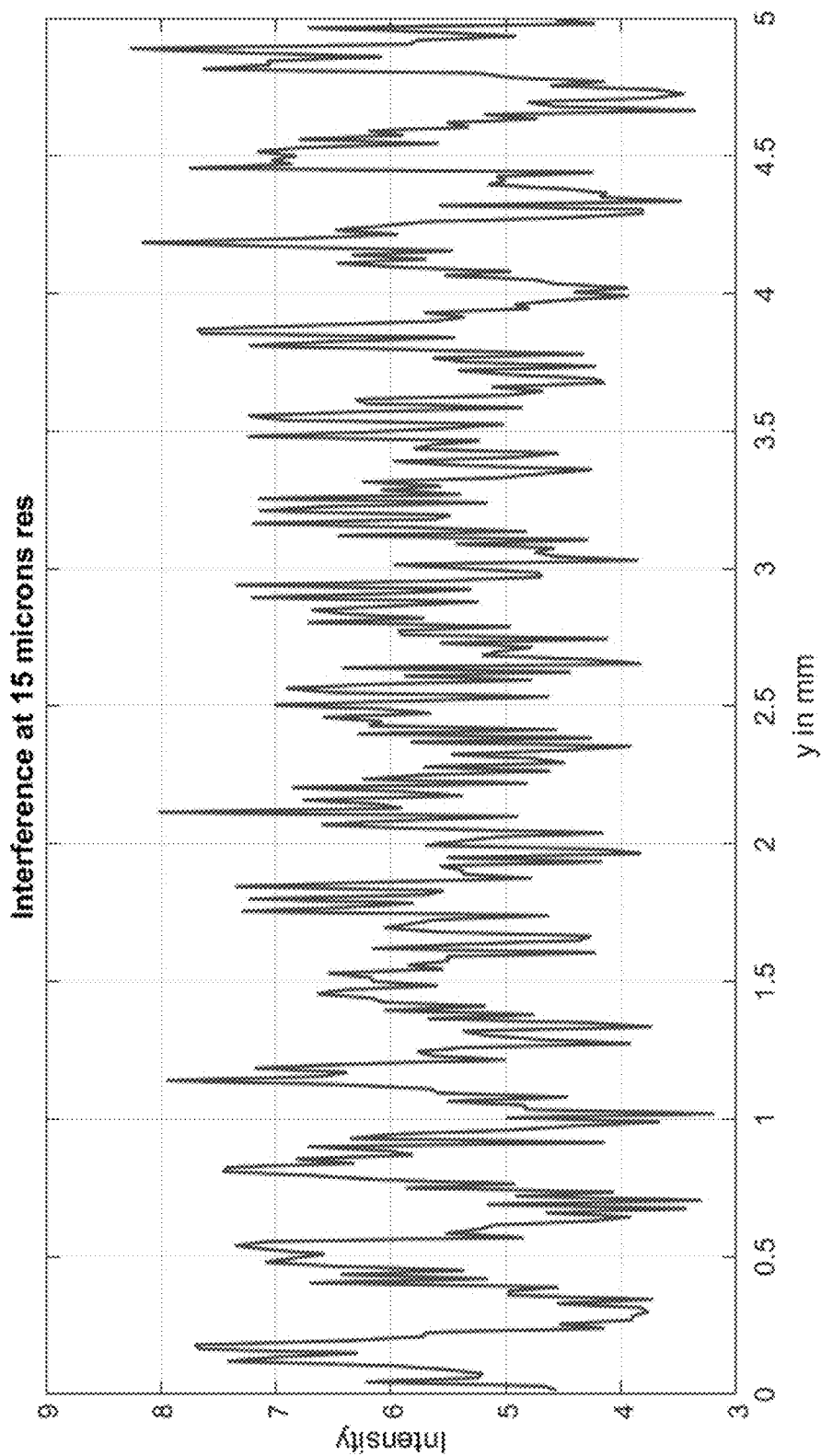
FIG. 5B shows the (full) line pattern at 15 μm resolution. The fringes are about 23 pixels (0.35 mm) at 15 μm resolution.

The full (5 mm) pattern is shown next at a 15 µm resolution in FIG. 5B. This is obtained by smoothing with a window and subsampling the interference pattern at 0.5 µm by factor of 30. FIG. 5B shows the entire line, for 15 µm. A repeating interference pattern at 15 m is clearly visible for this design.

FIG. 5B indicates that this system can be used for low-resolution (15 µm) fringe detection. At this resolution, each fringe is approximately 23 pixels trough-to-trough or about 0.35 mm. For single-shot mechanism therefore this is the approximate resolution of phase recovery that can be obtained, which is adequate for phase-image for some applications (such as medical imaging). To obtain the phase to within the resolution of the pixel-size of the detector or less, the phase-stepping method may be important.

Phase Stepping Results

The phase of an object can be analyzed in a single shot in the Fourier domain (to within fringe resolution) or via phase-stepping (pixel or sub-pixel resolution).

Figure 6A:
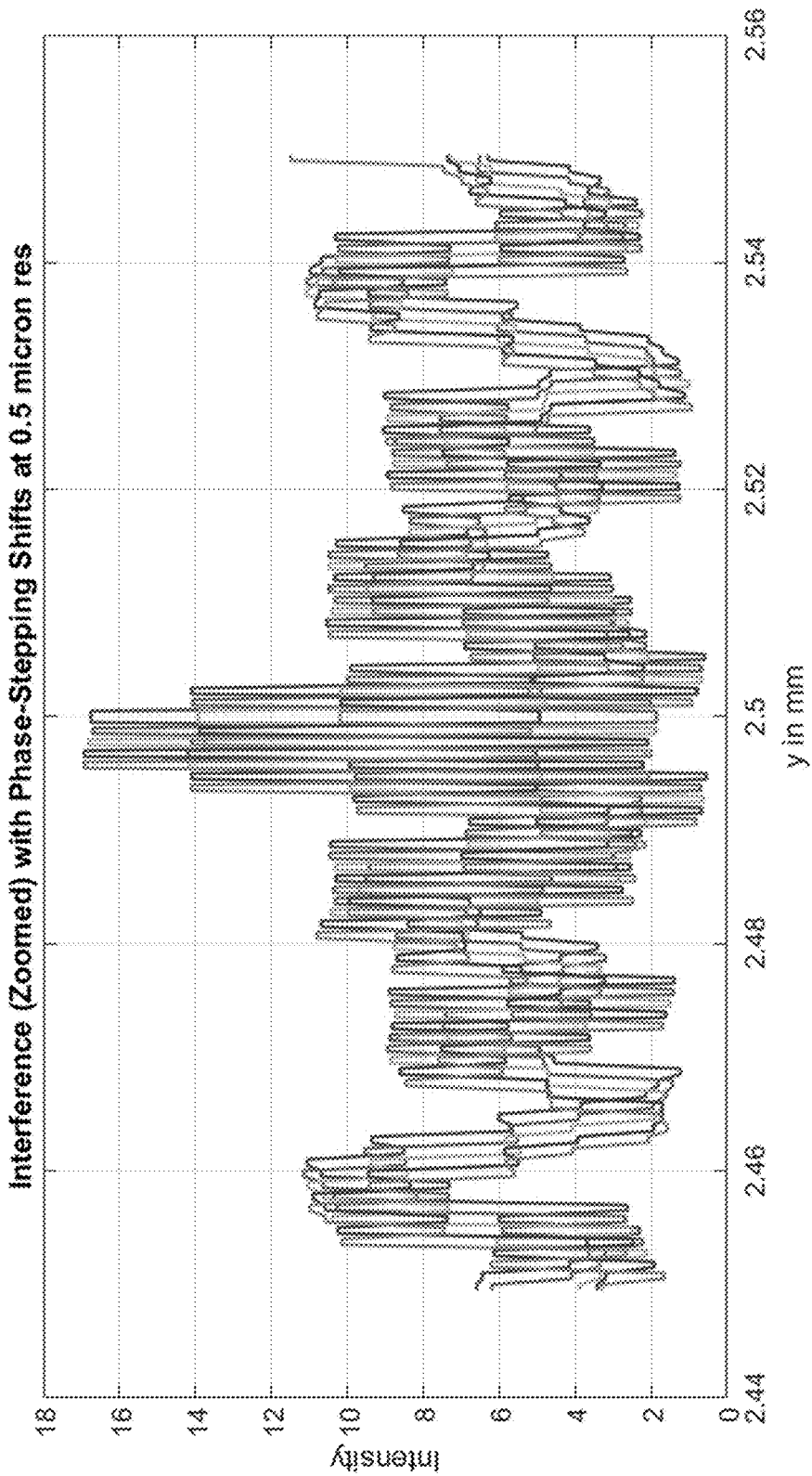
FIG. 6A shows an interference line-pattern (zoomed) at 0.5 μm resolution with five different delays (0 to 4 μm delay in steps of 1 μm) of the grating.
Figure 6B:
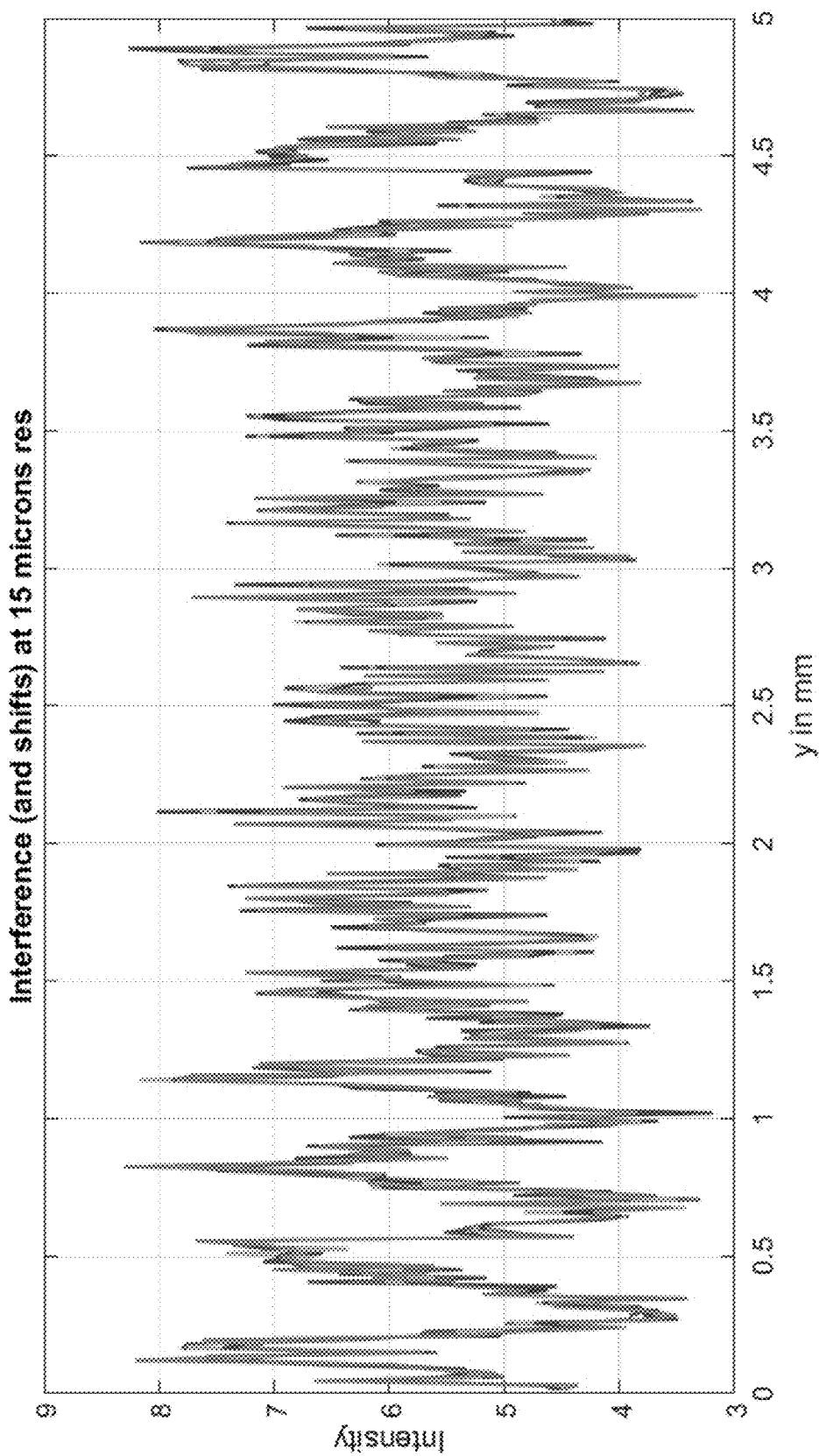
FIG. 6B shows the delayed (full) line patterns corresponding to FIG. 6A at 15 m resolution.

The grating according to some embodiments is operated using a phase-stepping method. The grating function can be moved in steps of 1 µm, with steps from 0 to 4 µm to evaluate the phase-stepping at the 0.5 µm resolution. FIG. 6A shows the delayed patterns at 0.5 µm resolution. The delay is discernable and would be amenable to auto-correlation analysis. FIG. 6B shows the delay patterns at 15 µm resolution. While at this resolution the delayed signals are sub-pixel, the signals may be analyzed with auto-correlation methods. Other delays in steps of 15 µm can be simulated.

Phase Recovery of an Object

The phase-stepping method can be used to recover the phase of a simulated object. This involves forward simulating with an object and phase-stepping (in steps of 15 µm) with and without the object and using the delayed interference lines with and without the object to recover the phase using established techniques [6]. The envelope function of the interference carpet for FIG. 4A is shown in FIG. 9 for better visibility.

Grating Design: Grating Materials of Interest

The simulations assumed a 0 to maximum phase shift of $\pi/2$. Different materials can be used to achieve the variable phase-shift. The maximum height for $\pi/2$-shift will be reduced successively from Si, Cu, Ni, Au (and hence deposit/etching times). $\pi/2$ as well as max-$\pi$-shift gratings are considered. The calculated heights are reported in Table 1. The refractive index (real-part, δ) was calculated from Eqn. 4 from Mamose [3]. The form-factors as a function of energy and other parameters required for the calculation were obtained from the NIST [29].

TABLE 1

Approximate Material Maximum Heights for $\pi/2$ and $\pi$ shifts at 37.8 keV

| Material | Max-Height (µm) | |
| --- | --- | --- |
| | $\pi/2$ phase-shift | $\pi$ phase-shift |
| Gold | 3.72 | 7.43 |
| Nickel | 6.59 | 13.19 |
| Copper | 6.84 | 13.68 |
| Silicon | 24.20 | 48.40 |

Phase contrast X-ray systems provide phase (refractive-index) images and scatter images in addition to transmission images obtained by conventional X-ray. This is independent additional information useful for material science, non-destructive imaging and medical imaging to distinguish materials. For example materials with similar attenuation coefficient will not show significant contrast in conventional X-ray but may provide discrimination in phase-images or dark-field [4, 25]. Since soft-tissue has the phase-shifting refractive index parameter (δ)~1000 times higher than the attenuation component (β), phase-contrast images will provide several factors of improved contrast for biomedical imaging and other applications. Scatter imaging for far-field interferometry has been shown to provide excellent images at fraction of dose of conventional X-ray [4].

All of the advantages of the far-field system [4, 5] over near-field Talbot-Lau interferometry holds for the system described herein. This includes (a) elimination of absorption grating (analyzer): direct visualization of fringes in a standard low-resolution X-ray detector resulting in dose reduction.

Advantages of the system described herein with respect to the state-of-the-art far-field systems [4, 5] are as follows. A single grating is used instead of 2 or 3 typically used [4, 5]. The system disclosed herein can be made more compact [30,31] than far-field systems [4,5] which is important for clinical imaging. For example, the system may have footprint of a mammogram system, 600 mm, in comparison with the far-field system [4-5], where the systems are about 1700 mm-2000 mm. The interference patterns can be "flat" or "curved" allowing the use of different shaped detectors. In particular curved detectors may have higher FOV, useful for medical applications [2]. The design is easily amenable to 2D grating with paraboloid structures and circular support which will allow for single-shot dark-field imaging, resulting in significant dose-reduction.

In some embodiments, the far-field systems may require higher lateral source coherence compared to Talbot-Lau interferometry. However both the state-of-the-art far-field system [4,5] and Talbot-Lau interferometry systems [1] has been operative with laboratory X-ray source coupled with a coherence grating. A single phase grating is used in the far-field system and the design can be more advanced than that in Talbot-Lau. However, since far-field does not need an analyzer, overall cost will be of the same order (or cheaper) even though this system is superior performance wise (less dose) than Talbot-Lau interferometry.

The systems and methods described herein may be used for a variety of phase contrast X-ray applications: non-destructive testing, medical imaging, and material science, for example. In addition, similar to the far-field method in [4,5], the system can be adopted for neutron imaging.

Phase contrast X-ray systems can be employed for advanced high resolution non-destructive testing applications such as for space and defense, and for medical imaging.

Phase contrast X-ray can be used in clinical settings. The state-of-the-art far-field system shows significant factor of dose reduction in imaging biological tissue [4] in comparison to current clinical X-ray, and provides added advantage due to phase and scatter information in addition to the conventional transmission image. Thus the system has significant potential in the medical domain. According to embodiments, the grating design disclosed herein can be used to help facilitate fabrication of large-area gratings for full-body medical applications.

Embodiments of the system can be used for non-destructive testing in material science (for example, for applications in defense and space). The interferometry technique and principles described herein can also be implemented for neutron imaging.

REFERENCES

[1] F. Pfeiffer, T. Weitkamp, O. Bunk and C. David, "Phase retrieval and differential phase-contrast imaging with low-brilliance X-ray sources," *Nature Physics* vol. 2, April 2006, (www.nature.com/naturephysics, published online: 26 Mar. 2006).

[2] T. Thuring, M. Abis, Z. Wang, C. David & M. Stampanoni, "X-ray phase-contrast imaging at 100 keV on a conventional source," *Nature. Scientific Reports*, vol. 4, no. 5198, June 2014.

[3] A. Momose, "Recent Advances in X-ray Phase Imaging," Japanese Journal of Applied Physics, Vol. 44, No. 9A, 6355-6367, 2005.

[4] Houxun Miao, Andrew A. Gomella, Katherine J. Harmon, Eric E. Bennett, Nicholas Chedid, Sami Znati, Alireza Panna, Barbara A. Foster, Priya Bhandarkar and Han Wen, "Enhancing Tabletop X-Ray Phase Contrast Imaging with Nano-Fabrication", *Scientific Reports*, August 2015, 5:13581, DOI: 10.1038/srep13581.

[5] Houxun Miao, Alireza Panna, Andrew A. Gomella, Eric E. Bennett, Sami Znati, Lei Chen and Han Wen, "A universal moiré effect and application in X-ray phase-contrast imaging," *Nature Physics* 12.9 (2016): 830.

[6] T. Weitkamp, A. Diaz, C. David, F. Pfeiffer, M. Stampanoni, P. Cloetens and E. Ziegler, "X-ray phase imaging with a grating interferometer," *Optics Express*, vol. 13, no. 16, pp. 6296-6304, August 2005.

[7] A. Sarapata, J. W. Stayman, M. Finkenthal, J. H. Siewerdsen, F. Pfeiffer, D. Stutman, "High energy X-ray phase contrast CT using glancing-angle grating interferometers," *Medical Physics*, vol. 41, no. 2, February 2014.

[8] D. Noda, H. Tsujii, N. Takahashi, and T. Hattori, "Fabrication of X-Ray Gratings Using X-Ray Lithography Technique for X-Ray Talbot Interferometer," *Journal of The Electrochemical Society,* 156 (5), H299-H302, 2009.

[9] C. David, J. Bruder, T. Rohbeck, C. Grünzweig, C. Kottler, A. Diaz, O. Bunk, F. Pfeiffer, "Fabrication of diffraction gratings for hard X-ray phase contrast imaging," *Microelectronic Engineering*, vol. 84, 1172-1177, 2007.

[10] I. Zanette, T. Zhou, A. Burvall, U. Lundström, D. H. Larsson, M. Zdora, P. Thibault, F. Pfeiffer, and H. M. Hertz, "Speckle-Based X-Ray Phase-Contrast and Dark-Field Imaging with a Laboratory Source," *Physics Review Letters*, vol. 112, 253903, June 2014.

[11] P. Moitra, B. A. Slovick, W. Li, I. I. Kravchencko, D. P. Briggs, S. Krishnamurthy and J. Valentine, "Large-Scale All-Dielectric Metamaterial Perfect Reflectors," *ACS Photonics*, pp. 692-698, vol. 2, May 2015.

[12] P. Duvauchelle, N. Freud, V. Kaftandjian, D. Babot, "A computer code to simulate X-ray imaging techniques," *Nuclear Instruments and Methods in Physics Research* B, vol. 170, pp. 245-258, 2000.

[13] A. Peterzol, J. Berthier, P. Duvauchelle, C. Ferrero, D. Babot, "X-ray phase contrast image simulation," *Nuclear Instruments and Methods in Physics Research* B, vol. 254, pp. 307-318, 2007.

[14] H. Wen, C. K. Kemble, and E. E. Bennett, "Theory of oblique and grazing incidence Talbot-Lau interferometers and demonstration in a compact source X-ray reflective interferometer," *Optics Express*, vol. 19, No. 25, 2011.

[15] S. Colonna, F. D'Acapito, S. Mobilio, S. Onori, L. Pugliani, S. Romanzetti and F. Rustichelli, "Curved optics for X-ray phase contrast imaging by synchrotron radiation," *Phys. Med. Biol.,* 46, 967-974, 2001.

[16] W. Cong, Y. Xi and G. Wang, "Spherical grating based X-ray Talbot interferometry," *Med. Phys*, vol. 42, no. 11, November 2015.

[17] Z. Wang, P. Zhu, W. Huang, Q. Yuan, X. Liu, K. Zhang, Y. Hong, H. Zhang, X. Ge, K. Gao and Z. Wu, "Analysis of polychromaticity effects in X-ray Talbot interferometer," *Anal Bioanal Chem,* 397, 2137-2141, 2010.

[18] S. Berujon, H. Wang, I. Pape and K. Sawhney, "X-ray phase microscopy using the speckle tracking technique," *Applied Physics Letters* 102, 154105, 2013.

[19] X. Wu and H. Liu, "Clinical implementation of X-ray phase-contrast imaging: Theoretical foundations and design considerations," *Medical Physics* 30, 2169, 2003.

[20] X. Wu, H. Liu, A. Yan, "Phase-contrast X-ray tomography: Contrast mechanism and roles of phase retrieval," *European Journal of Radiology* 68S, S8-S12, 2008.

[21] X. Wu and H. Liu, "A general theoretical formalism for X-ray phase contrast imaging," *Journal of X-Ray Science and Technology,* 11, 33-42, 2003.

[22] T. Weitkamp, C. David, C. Kottler, O. Bunk, and F. Pfeiffer, "Tomography with grating interferometers at low-brilliance sources," Invited Paper, *Proc. of SPIE*, vol. 6318 63180S-5.

[23] C. Chang & A. Sakdinawat, "Ultra-high aspect ratio high-resolution nanofabrication for hard X-ray diffractive optics," *Nature Communications*, 27 Jun. 2014.

[24] M. Kagias, Z. Wang, P. Villanueva-Perez, K. Jefimovs, and M. Stampanoni, "2D-Omnidirectional Hard-X-Ray Scattering Sensitivity in a Single Shot," Phys. Rev. Lett. 116, 093902, 3 Mar. 2016.

[25] W. Cong, Y. Xi and G. Wang, "Spherical grating based X-ray Talbot Interferometry," *Med Phys*, vol. 42, no. 11, pp. 6514-6519, November 2015.

[26] Han Wen, "A universal moiré effect and application to X-ray imaging," Presentation at LSU, Mar. 3, 2017.

[27] *Introduction to Fourier Optics*, J. Goodman, McGraw Hill, $2^{nd}$ Ed. 1988.

[28] Principles of Optics, Electromagnetic Theory of Propagation, Interference and Diffraction of Light, M. Born and E. Wolf, Pergamon Press Ltd., $4^{th}$ Ed, 1970.

[29] http://physics.nist.gov/PhysRefData/FFast/html/form.html

[30] J. Dey, J. Xu, K. Ham, N. Bhusal, V. Singh, "A Novel Phase Contrast System," presentation, IEEE NSS-MIC, October 2017 (oral).

[31] Jingzhu Xu, Joyoni Dey, Kyungmin Ham, Narayan Bhusal, Leslie G. Butler, "Two-dimensional single grating phase contrast system," Proc. SPIE 10573, Medical Imaging 2018: Physics of Medical Imaging, 1057323 (9 Mar. 2018); doi: 10.1117/12.2292829; https://doi.org/10.1117/12.2292829

EXAMPLES

The following examples describe some embodiments in more detail. The broad concepts of the current invention are not intended to be limited to the particular examples.

Example 1

Phase contrast X-ray represents a break-through in X-ray and CT imaging. In particular, embodiments of the single-phase-grating far-field phase contrast X-ray system described herein have a strong value proposition for physicians at hospitals and clinics because they allow more detailed, higher contrast images to be acquired at a lower X-ray dose. The technology can not only provide all the information of conventional X-ray (attenuation of tissue), it can also provide two other modalities: phase and scatter. Scatter images provided by the technology are far more sensitive to structural and density changes of lungs and can identify lung disease where conventional X-ray fails. Therefore there is an immediate need for diagnostic chest phase contrast X-ray imaging of lung-disease (e.g., COPDs, emphysema, fibrosis, pneumothorax, lung cancer detection and metastasis). Other areas poised to benefit greatly from the system and methods described herein are mammography and bone joint imaging (e.g., imaging rheumatoid arthritis). Other non-medical applications include non-destructive testing (NDT) for battery, oil and gas industry.

Existing phase contrast X-ray products under investigation include a system developed by NIH investigators Miao et al. [2-3], which uses 2-3 phase gratings (instead of one as in the present system) and is costlier and requires higher dose. Additionally, the grating system described herein can provide single-scan scatter images, which has the clinical advantage of reducing the time of the acquisition over the existing products.

Immediate Applications (a) Lung Disease: The systems and methods described herein can fill a gap in lung-imaging where conventional X-ray fails to provide adequate information. The prevalence of lung diseases in USA alone is in 100 s per 100,000 per year. Example incidence of collapsed lungs (pneumothorax) alone is 26 in 100,000 [23]. Worldwide COPDs killed 3 million people in 2015 alone [8]. Greater than 90% of COPDs occur in low and middle income families [8]. Severe pollution, smoking, etc., being a high-risk factor for lung disease, societal need of rapid assessment of lung-disease and treatment is increasing in low income countries and in the major cities in the developing world like Beijing, Shanghai, New Delhi, and Kolkata.

(b) Rheumatoid arthritis Imaging: Rheumatoid arthritis is a chronic disease affecting about 1% of the world population (or ~74 million), with 1.29 million affected in USA alone [24]. Rheumatoid arthritis imaging involves X-Ray tests to look for signs of bone erosion, inflammation and swelling, tissue damage and overall joint deterioration in patients. They are used for the detection of rheumatoid arthritis symptoms and in monitoring the progression of the disease over time.

(c) Breast-cancer imaging: In 2014, an estimated ~3.3 million women lived with breast cancer in USA alone [25]. The number of new cases of female breast cancer was 124.9 per 100,000 women per year. Screening with mammograms is recommended each year for women over 50.

The most popular phase contrast X-ray system is the near-field Talbot-Lau interferometry [4-6, 9-19]. This is the original design from Momose [5] and Pfeiffer et al. [6]. The systems and methods described herein are a significant improvement over the nearfield Talbot-Lau system. The design for a system disclosed herein has several advantages over Talbot-Lau systems: (a) it does not require an absorption grating, reducing the X-ray radiation dose to the patient (by at least a factor of two); (b) elimination of absorption grating (typically made of gold) also reduces system cost significantly.

The NIH has developed a far-field system [2-3]. However, in comparison to the NIH system [2-3], the system described herein requires just one grating instead of 2 or 3. Another aspect is that for dark-field imaging typically the object or the X-ray system has to be rotated to obtain scatter from all direction. However, the grating described herein can have a circular support in 2D, providing single-shot (single-scan) dark-field imaging: capturing the X-ray scatter at different angles in a single scan. This significantly reduces acquisition time of dark-field images.

Thus, the systems and methods described herein can provide a lower-cost, lower-dose, faster system, which is also straight-forward to build (e.g., a single grating instead of several).

According to embodiments, with an adequately large area grating built for the application, the grating can be straight-forwardly inserted into a standard X-ray system in between the source and the detector. A direct "no-stepping" integration can allow for resolutions of the order of fringe-pitch (0.1-0.4 mm). Better resolution (0.015 mm) may be achieved by inserting a phase-stepping gig such as available in the CAMD system [4] to enable stepping of the grating and processing the changes in the interference pattern. The system can be incorporated into existing or developing interferometry systems by swapping out optics (phase-grating) and eliminating the absorption grating.

Figure 7:
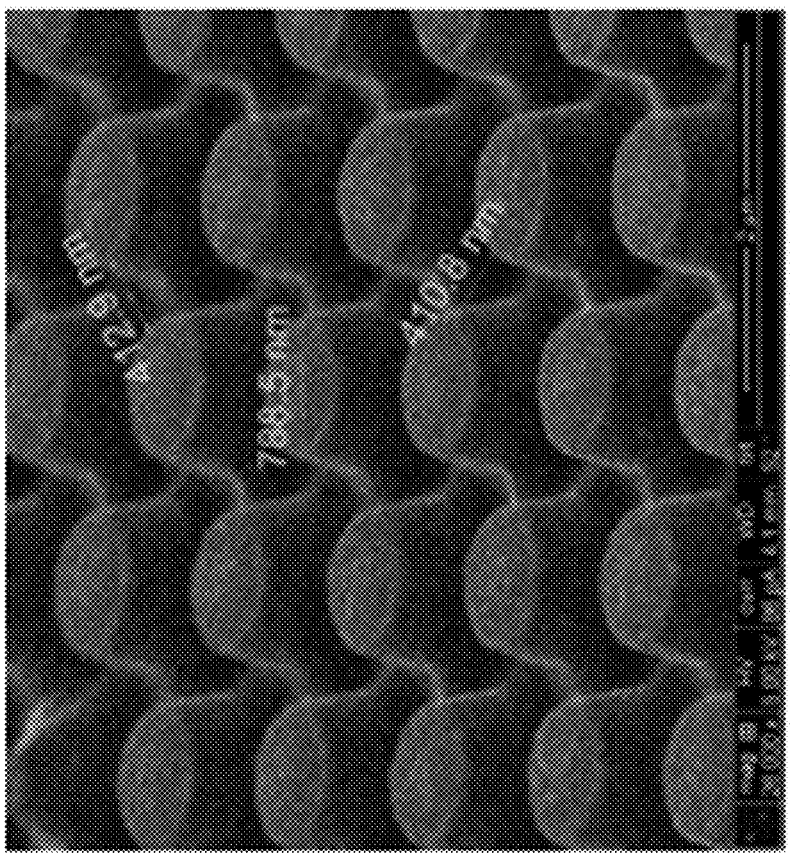
FIG. 7 shows examples of nano/micro-structures built using focused ion beam (FIB) that had slope and/or a curved surface.
Figure 7:
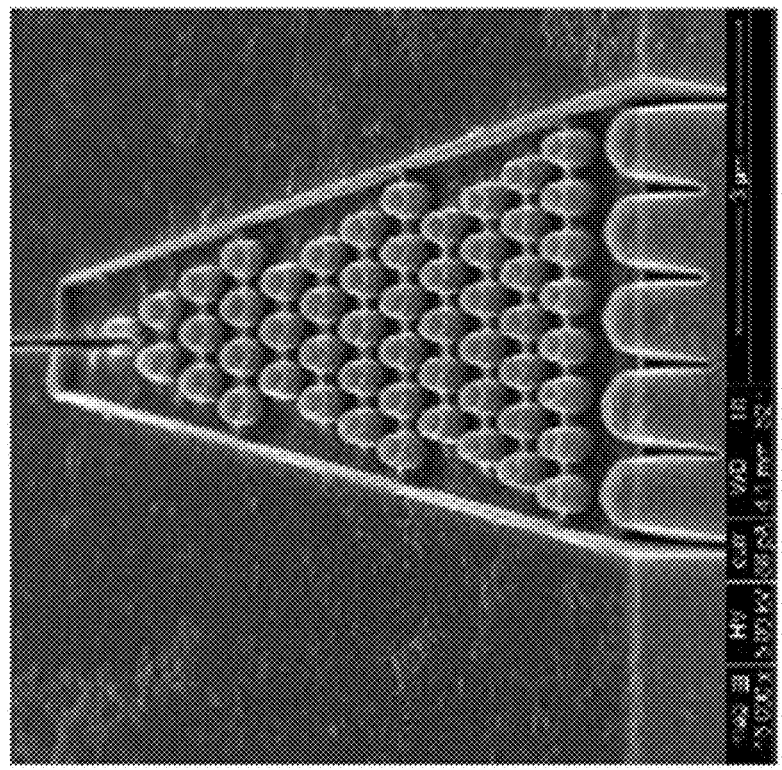

According to embodiments, the phase grating design disclosed herein requires a special shape that can be built with existing technology at Microfabrication centers CAMD and UNC. The required grating fabrication involves well established techniques of building optical masks, resist coating and patterning, electroplating gold and finally using focused ion beam (FIB) to curve out the required shape. FIG. 7 shows examples of nano/micro-structures built using FIB that had slope and/or a curved surface.

Figure 8:
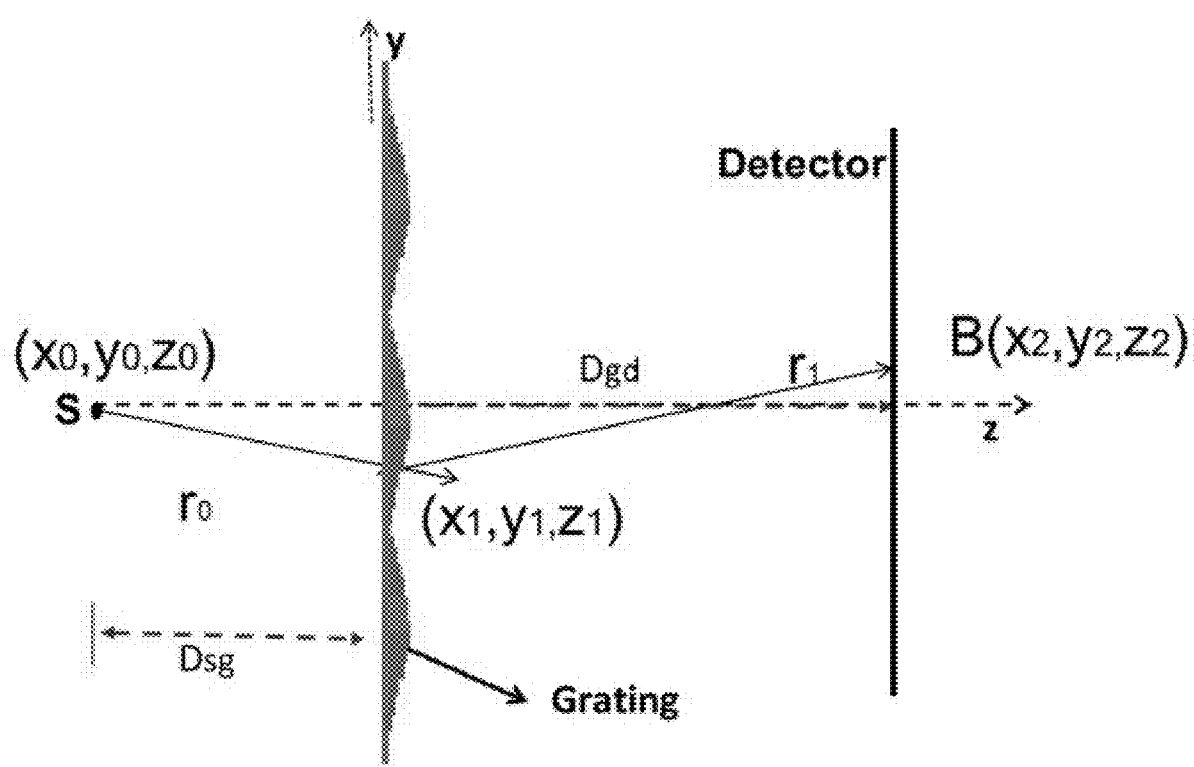
FIG. 8 shows a simulation system diagram.

Full Sommerfeld-Rayleigh integral simulations were performed of a single-grating X-ray system with the grating function (schematic in FIG. 8). The interference pattern was evaluated at different detector distances downstream from the grating. Slow varying (near millimeter) patterns were observed at repeated distance intervals from the grating. FIG. 9 shows the interference pattern has exceptionally high visibility, +/−80%, in the center region; the side regions are affected by edge effects (due to the small number of gratings used in this initial simulation). But the ~30-50% pattern visibility even at the edges (region y<2 mm and y>3 mm) demonstrate the robustness of the grating design. The depth-of-field, roughly 0.1 mm along z, can be tuned with placement distances and grating parameters but currently matches CT scintillator thickness. The pattern period, 0.35 mm, far exceeds CT detector resolution (0.015 mm) making this an operational system design. Other necessary design parameters of a successful CT scanner—sample thickness (human thorax), scattering length (lung image contrast)—can be met by this system design. The system exceeds the performance of the current state of the art system, Miao et al. [2, 3]. The functionality that requires 2-3 optics in the design of Miao et al. [2, 3] is accomplished in one X-ray optic in the systems described herein. One optic means lower cost, lower X-ray dose, and reduced alignment problems.

Micro-Fabrication of Grating

Si wafers of required size (for example, 4" in dimeter) can be deposited with required metal coating (typically chromium and gold) to make them conductive. Simultaneously, an optical mask can be designed and patterns defined by different sizes of grating (1.5×1.5 mm; 1.5×3.0 mm; 3.0×3.0 mm; 1.5×10 mm) can be fabricated. Dicing lines can also be patterned using the same mask. Once the patterning is done, gold >3.72 μm can be electroplated. Then the wafers with metallic coating can be coated with a resist which can be patterned using the optical mask, UV-mask aligner, and other supporting equipment in the cleanroom. The wafer(s) can be diced into pieces (along the dicing lines) of size 30×10 mm, for example. This can act as a holder of the grating to be mounted on the tomography beamline, for subsequent tests to characterize the fabricated grating. The samples can have electroplated gold which can be patterned using focused ion beam (FIB) to make the required shaped surface. This curved gold structure can act as the phase contrast grating. However, this configuration is provided as an example only, and the embodiments of the invention are not limited to this configuration for the phase contrast grating.

REFERENCES FOR EXAMPLE 1

[1] "Digital X-ray Market by Application (Mammography, Dental, Chest Imaging, Cardiovascular), Technology (Computed, Direct), Portability (Ceiling Mounted, Mobile), Type of System, End User (Diagnostic Center, Hospitals), Price—Global Forecast to 2020," *Market and Markets*, Report Code MD 2562, February 2016.

[2] H. Miao, A. A. Gomella, K. J. Harmon, E. E. Bennett, N. Chedid, S. Znati, A. Panna, B. A. Foster, P. Bhandarkar and H. Wen, "Enhancing Tabletop X-Ray Phase Contrast Imaging with Nano-Fabrication," *Scientific Reports*, vol. 5, no. 13581, August 2015.

[3] H. Miao, A. Panna, A. A. Gomella, E. E. Bennett, S. Znati, L. Chen and H. Wen, "A universal moiré effect and application in X-ray phase-contrast imaging," *Nature Physics*, vol. 12, pp. 830-834, April 2016.

[4] S. Marathe, L. Assoufid, X. Xiao, K. Ham, W. W. Johnson, and L. G. Butler. "Improved Algorithm for Processing Grating-Based Phase Contrast Interferometry Image Sets," *Rev. Sci. Instrum.*, vol. 85, no. 013704, 2014.

[5] A. Momose, "Recent Advances in X-ray Phase Imaging," *Japanese Journal of Applied Physics*, Vol. 44, No. 9A, 6355-6367, 2005.

[6] F. Pfeiffer, T. Weitkamp, O. Bunk and C. David, "Phase retrieval and differential phase-contrast imaging with low-brilliance X-ray sources," *Nature Physics* vol. 2, April 2006, (www.nature.com/naturephysics, published online: 26 Mar. 2006).

[8] World Health Organization (WHO) "Chronic Respiratory Diseases (COPD)," Fact sheet, November 2016.

[9] A. Velroyen, A. Yaroshenko, D. Hahn, A. Fehringer, A. Tapfer, M. Müller, P. B. Noël, B. Pauwels, A. Sasov, A. Ö. Yildirim, O. Eickelberg, K. Hellbach, S. D. Auweter, F. G. Meinel, M. F. Reiser, M. Bech, F. Pfeiffer, "Grating-based X-ray Dark-field Computed Tomography of Living Mice," *Ebiomedicine*, vol. 2, pp. 1500-1506, 2015.

[10] Andre Yaroshenko, Tina Pritzke, Markus Koschlig, Nona Kamgari, Konstantin Willer, Lukas Gromann, Sigrid Auweter, Katharina Hellbach, Maximilian Reiser, Oliver Eickelberg, Franz Pfeiffer and Anne Hilgendorff, "Visualization of neonatal lung injury associated with mechanical ventilation using X-ray dark-field radiography," Sci. Rep. 2016; 6: 24269.

[11] S. B. Hooper, M. J. Kitchen, A. Fouras, N. Yagi, K. Uesugi, R. A. Lewis, "Long-term Proposal Report 2:Phase Contrast X-ray Imaging of the Lung," SPring-8/JASRI, Sayo, Hyogo, Japan, pp. 232-237, vol. 17, 2012.

[12] S. J. Simpson, K. K. W. Siu, N. Yagi, J. C. Whitley, R. A. Lewis, P. B. Frappell, "Phase Contrast Imaging Reveals Low Lung Volumes and Surface Areas in the Developing Marsupial," *PLoS ONE*, vol. 8, no. 1, e53805. doi:10.1371/journal.pone.0053805.

[13] Huimin Lin, Binquan Kou, Xiangting Li, Yujie Wang, Bei Ding, Chen Shi, Huanhuan Liu, Rongbiao Tang, Jianqi Sun, Fuhua Yan, Huan Zhang, "Grating-based Phase-Contrast Imaging of Tumor Angiogenesis in Lung Metastases," *PLoS ONE*, vol. 10, no. 3, e0121438. doi: 10.1371/journal.pone.0121438 pp. 1-12, March 2015.

[14] J. Tanaka, M. Nagashima, K. Kido, Y. Hoshino, J. Kiyohara, C. Makifuchi, S. Nishino, S. Nagatsuka, A. Momose, "Cadaveric and in vivo human joint imaging based on differential phase contrast by X-ray Talbot-Lau interferometry," *Z. Med. Phys.* vol. 23 pp. 222-227, 2013.

[15] D. Stutman, T. J. Beck, J. A. Carrino, and C. O. Bingham, "Talbot phase-contrast X-ray imaging for the small joints of the hand," *Phys Med Biol*. vol. 56, no. 17, pp. 5697-5720, 2011.

[16] A. Tapfer, M. Bech, A. Velroyen, J. Meiser, J. Mohr, M. Walter, J. Schulz, B. Pauwels, P. Bruyndonckx, X. Liu, A. Sasov, and F. Pfeiffer. "Experimental results from a preclinical X-ray phase-contrast CT scanner," *PNAS*, 109 (39):15691-15696, 2012.

[17] Kai Scherer, Lorenz Birnbacher, Michael Chabior, *Julia* Herzen, Doris Mayr, Susanne Grandl, Anikó Sztrókay-Gaul, Karin Hellerhoff, Fabian Bamberg, Franz Pfeiffer, "Bi-directional X-ray Phase-Contrast Mammography," *PLoS ONE*, vol. 9, no. 5, e93502, May 2014.

[18] Z. Wang, N. Hauser, G. Singer, M. Trippel, R. A. Kubik-Huch, C. W. Schneider, M. Stampanoni, "Non-invasive classification of micro-calcifications with Phase-Contrast X-ray Mammography," *Nature Communications* vol. 5, no. 3797, May 2014.

[19] T. Koehler, H. Daerr, G. Martens, N. Kuhn, S. Löscher, U van Stevendaal, E, Roessl. "Slit-scanning differential X-ray phase-contrast mammography: Proof-of-concept experimental studies," *Med. Phys.* vol. 42, no. 4, pp. 1959-1965, April 2015.

[20] Siemens Innovation page https://www.siemnens.com/innovation/en/home/pictures-of-the-future/health-and-well-being/medical-imaging-new-X-ray-revolution.html

[21] GE Global research http://www.geglobalresearch.com/locations/munich-germany/technology-and-discovery

[22] Konika/Minolta https://www.konicaminolta.com/healthcare/technologv/phasecontrast/

[23] Brian J. Daley, MD "Pneumothorax," *Medscape*, Jul. 20, 2016 http://emedicine.medscape.com/article/424547-overview

[24] Rheumatoid arthritis Statistics https://rheumatoidarthritis.net/what-is-ra/ra-statistics/

[25] Cancer Stat Facts: Female Breast Cancer https://seer.cancer.gov/statfacts/html/breast.html Example 2

Phase Contrast X-ray represents a break-through in X-ray and CT imaging. The technology not only provides all the information of conventional X-ray (attenuation of tissue), it provides two other modalities (phase and scatter). This has tremendous immediate and long-term significance for X-ray medical imaging and non-destructive testing.

For soft-tissue imaging, the real part of the reflective index $\delta$ is about ~1000 times the imaginary part $\beta$ (related to the attenuation), lending strong contrast between soft-tissue (that is typically not present in conventional X-ray imaging attenuation coefficient). Perhaps even more importantly, scatter (dark-field) images provided by the technology are far more sensitive to structural and density changes of tissue such as lungs. Phase Contrast X-ray can identify lung disease where conventional X-ray fails [ex. 1-2]. Other areas poised to benefit greatly are mammography [3-5] and bone joint imaging (e.g., imaging arthritis) [6-7]. Of the various interferometer techniques, the two at the forefront are Far-field Interferometry [8-9] and Talbot-Lau interferometry [10-11]. While the Talbot Lau interferometry is the most widely adopted and has made clinical progress [ex. 1-7], an absorption grating (analyzer) is needed to see interference patterns with standard cost-effective X-ray detectors. The analyzer is detrimental from dose-consideration. Recently the far-field X-ray interferometry Miao et al. [8-9] eliminated the need for the analyzer by using two (or three) phase-gratings with slight differences in pitch between them to create a low-varying "beat-frequency". The ensuing moiré pattern fringes are directly visible with a standard detector (without analyzer) reducing the dose [9]. Another important feature of the Miao et al far-field interferometer is that it accesses 2-3 fold better range of scatters than Talbot-Lau. However one potential drawback is the large source-to-detector distance necessary: 1730 mm in [9] and about 2000 mm in [8], which will lower X-ray fluence at the detector.

Dey et al. has disclosed a novel design [12] for an X-ray interferometer system that will achieve interference patterns visible by standard detectors, using a single phase-grating (along with a source-coherence grating). The analyzer grating or other phase-gratings are not necessary. The design can be tuned to a range of different source-to-detector distances (ex. 500 mm-1000 mm). Herein, a parallel-beam simulation at 38 keV (CAMD synchrotron beamline characteristics) is disclosed with a detector-to-grating distance of 50 mm.

The grating according to some embodiments introduces a deliberate spatial dependence of phase in addition to a linear grating to build up a slow varying fringe pattern on a standard X-ray detector. The slow-varying spatial function may be quadratic ("chirp"-grating), sinusoid, spherical, etc. A grating design using alternate linear and curved-linear patterns is shown in FIG. 10.

FIG. 10 shows an illumination source S adapted to illuminate a region of interest. A diffraction grating is positioned between the source and the detector. The grating is adapted to receive illumination from the illuminated region of interest (not shown in FIG. 10). The diffraction grating has a spatial structure having a first periodicity superimposed with a second periodicity that is different from the first periodicity. For example, the grating has a period p, as shown in the inset in FIG. 10, which may be considered the first periodicity. The grating also has a variation in height, which is repeated with a second period W that is different from the period p. Alternatively or additionally, the grating may have a variation in pitch that is slow as compared to the period p. A detector is adapted to detect illumination passing through the diffraction grating. The spatial structure imparts a first phase dependence based on the first periodicity (p in FIG. 10) and an additional phase dependence based on the second periodicity (W in FIG. 10) on the illumination passing through the diffraction grating.

The base linear grating height (h1) is such that it induces $\pi/2$ (in z, the direction of the beam propagation) phase. The curved structure with a varying height induces a 0 to a maximum of $\pi/2$. The net maximum is a n shift, corresponding to height h2.

To test this concept full Sommerfield-Rayleigh integral simulations [13-14] of a single-grating X-ray system were performed with an alternating linear and linear-quadratic grating function schematically shown in FIG. 10. The general formation of the image with the object is considered, and then without the object to observe the reference interference pattern. The chirp grating is assumed to introduce a transmission and phase delay of the form $$G(x,y,z)T_G(x,y,z)\exp\left(j\varphi_r(x,y,z)\right) \quad (2.1)$$

where $\varphi_r(x,y,z)$ is in the form of a quadratic in x and y for a finite support which is then repeated. For the 1-D case, the quadratic dependence is on y for all x.

The reference pattern at detector is, $$A(x_2, y_2, z_2) = \quad (2.2)$$
$$\frac{1}{j\lambda}\int_G U(P_S)\frac{\exp(-jkr_0)}{r_0}G(x_1, y_1, z_1)\frac{\exp(-jkr_1)}{r_1}(\hat{r}_0 \cdot \hat{r}_1)dx_1 dy_1 dz_1$$

and the measured intensity is $$I(x_2,y_2,z_2)=|A(x_2,y_2,z_2)|^2 \quad (2.3)$$

Physically the function means each point of the detector "sees" (weighted with obliquity factor) and superposes the "Huygens" wave emitted from all the grating points.

"Reference" Pattern: The reference image was simulated with the parameters below. A monochromatic X-ray source is assumed at 37.8 keV. The source beam is assumed parallel. This corresponds to the current beamline at CAMD. But even for an X-ray tube-source (with coherence grating), paraxial approximation may be used and a parallel beam configuration of each spherical wave may be adopted [13, 16]. For the phase-grating to detector the spherical wave $\exp(-jkr_1)/r_1$ is used without approximation in simulation.

Figure 11:
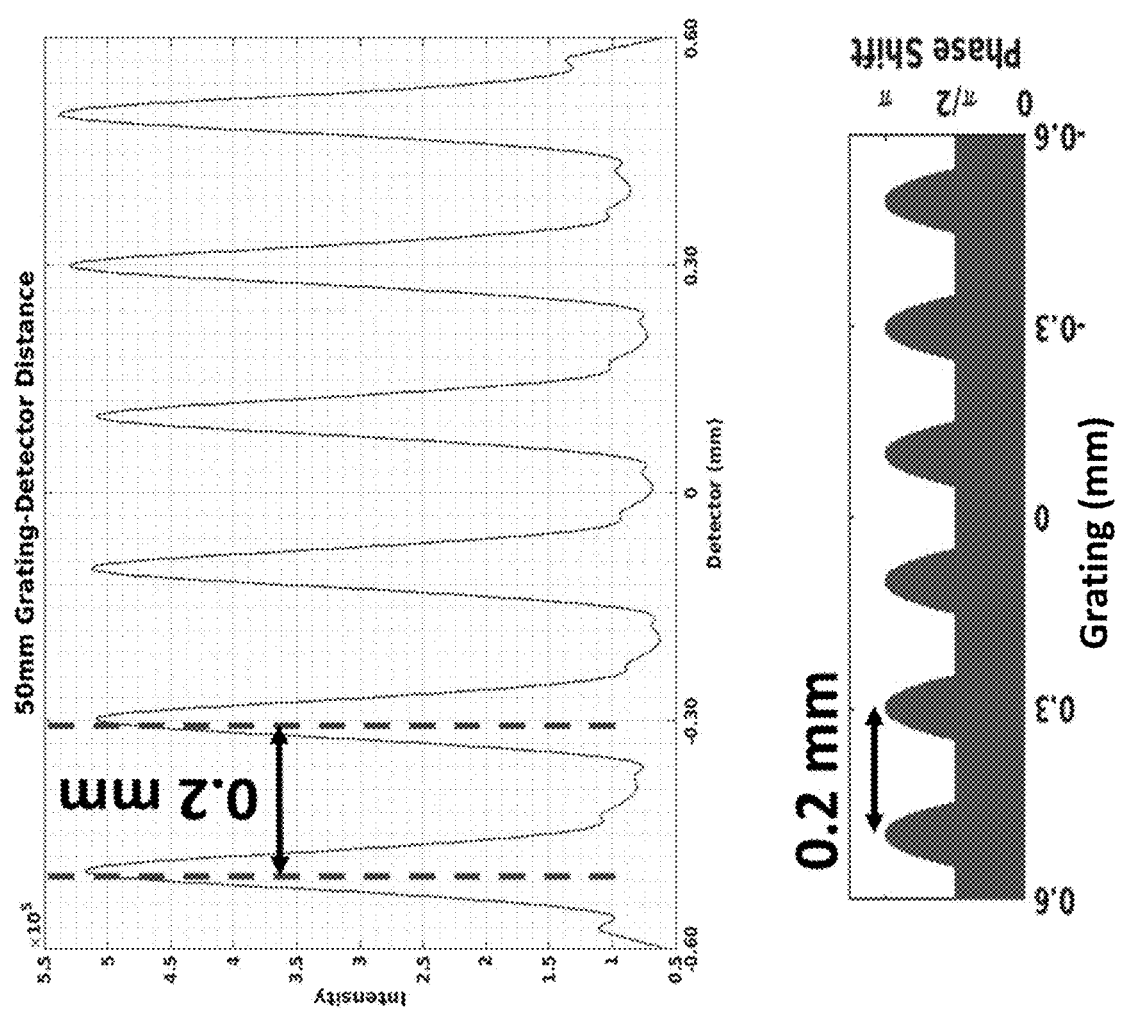
FIG. 11 shows an interference pattern at 1-micron resolution for W=0.2 mm grating peak-to-peak width. The grating-to-detector distance is 50 mm.
Figure 12:
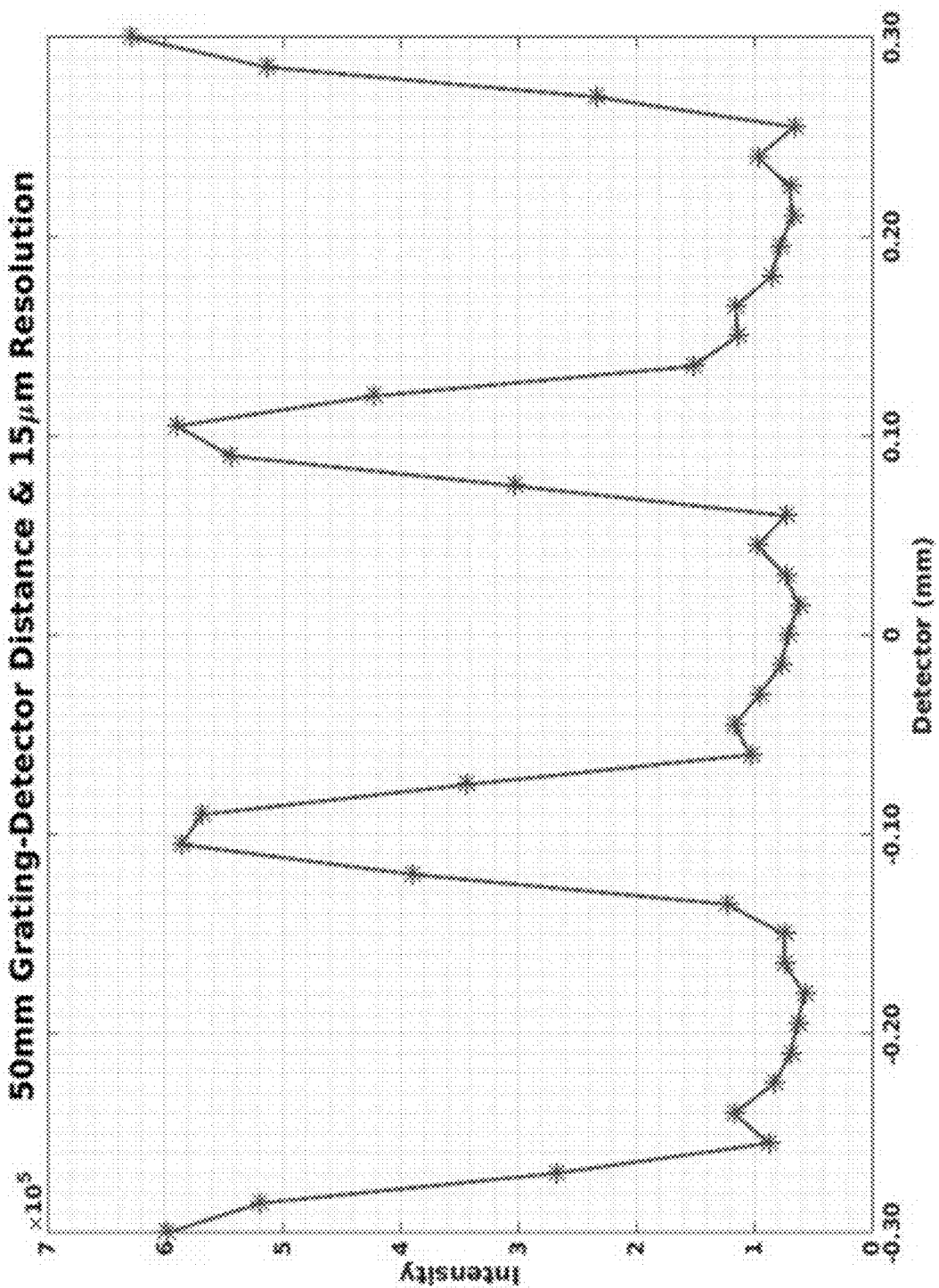
FIG. 12 shows an interference pattern at 15-micron resolution for 0.2 mm grating peak-to-peak width. The grating-to-detector distances is 50 mm.
Figure 13:
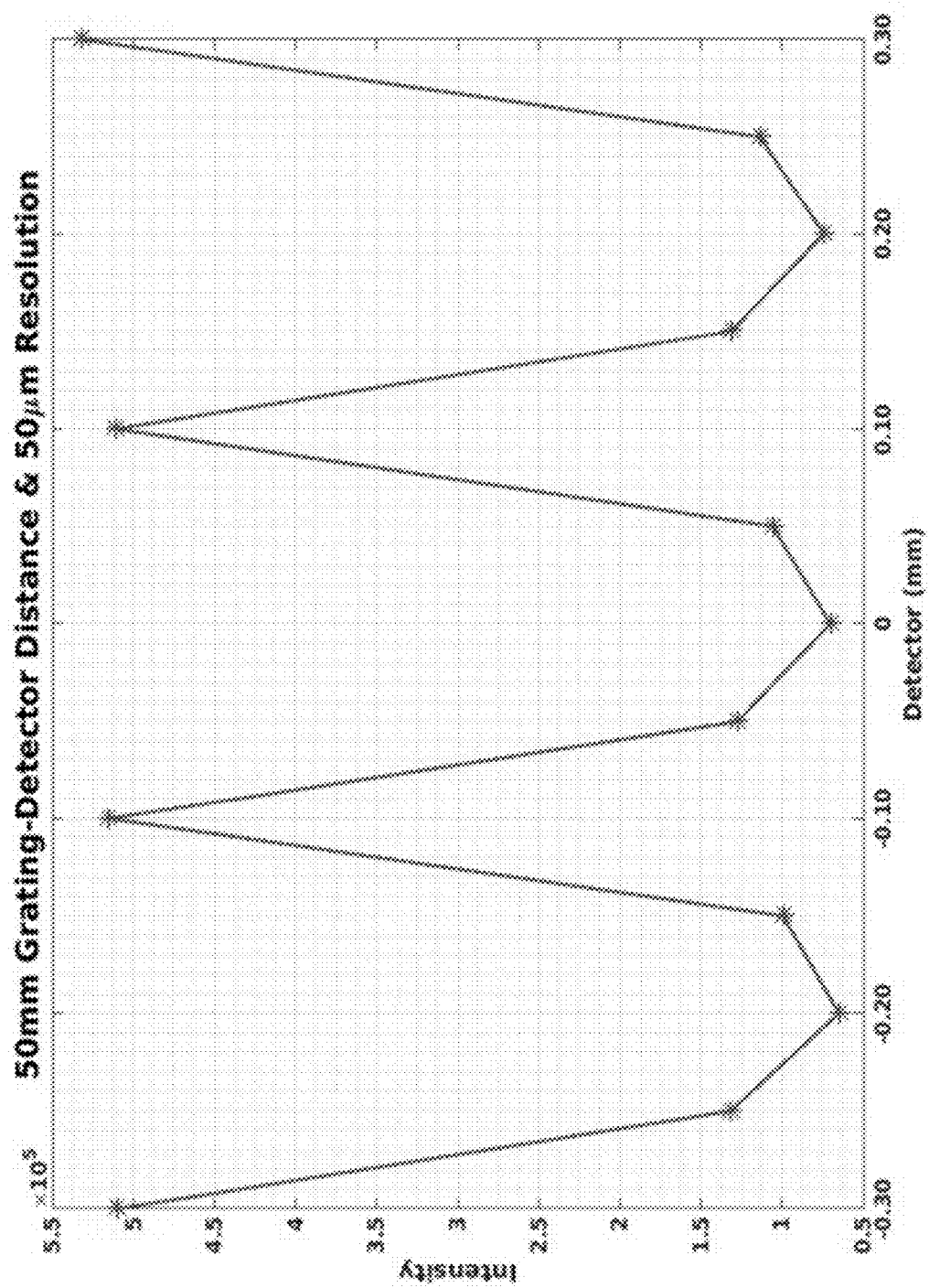
FIG. 13 shows an interference pattern at 50-micron resolution for 0.2 mm grating peak-to-peak width. The grating to detector distances is 50 mm.

The linear-quadratic grating phase function is sampled with 1 nm sampling (y-direction sampling). FIG. 11 (bottom) shows the extent of the grating function (1.2 mm) with the width W=200 am. The intensity is then calculated with Eqns. 2.2 and 2.3, for grating-to-detector distance $D_{dg}$=50 mm. The slow varying patterns at 1 µm are shown in FIG. 11 (top). The peak-to-peak distance is 200 µm. The interference carpet was smoothed and subsampled at the 15 µm (0.015 mm) CAMD interferometry CT resolution and shown in FIG. 12. The pattern period, 0.2 mm, exceeds the CAMD interferometer CT detector resolution (15 µm) or the 50 µm detector resolution used in mammogram system [5] making this an operational system design. FIG. 13 shows the pattern with 50 µm resolution.

The simulator can be generalized by modeling spatially extended polychromatic source for modeling laboratory X-ray tube. A complex object transfer function (with transmission and phase) may be inserted between source and grating or grating and detector in Eqn. 2.2.

Figure 14:
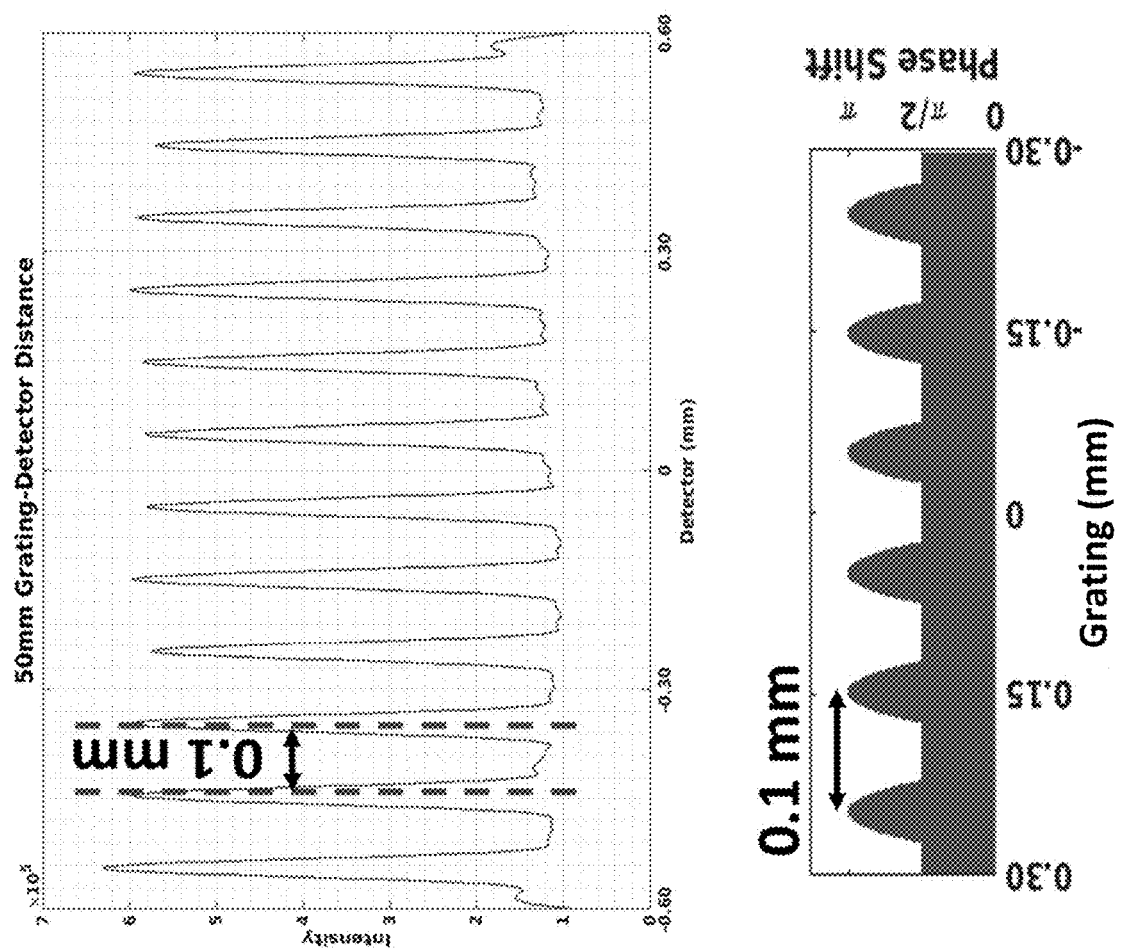
FIG. 14 shows an interference pattern at 50-micron resolution for 0.1 mm grating peak-to-peak width. The grating to detector distance is 50 mm.

FIG. 14 demonstrates that the interference pitch visible in the detector may be controlled by changing the grating pattern. If the W is halved the interference pitch is halved as well. Note that the fringe contrast is excellent but one caveat is that for some systems, scatter and de-coherence due to polychromaticity of X-ray tube source may affect the fringe contrast.

A novel single-phase-grating far-field phase contrast system was simulated using Sommerfield-Rayleigh diffraction integrals. In one X-ray optic functionality it is accomplished that requires 2-3 optics in the Miao et al. design [8-9]. The benefits of not requiring the absorption grating (analyzer) in Talbot-Lau interferometers is retained. This will reduce the dose-requirement (by a factor of two). Also, reducing the multiple gratings of Miao et al. to a single grating significantly reduces the space required to enclose the system, as well as the strength of the X-ray tube required to acquire an image. Using the system described herein, an interference pattern (pitch 0.2 mm) was observed for a grating-to-detector distance of 50 mm for a parallel X-ray source. The interference pattern can be tuned to different applications depending on detector resolution.

REFERENCES FOR EXAMPLE 2

[1] A. Velroyen, A. Yaroshenko, D. Hahn, A. Fehringer, A. Tapfer, M. Müller, P. B. Noël, B. Pauwels, A. Sasov, A. Ö. Yildirim, O. Eickelberg, K. Hellbach, S. D. Auweter, F. G. Meinel, M. F. Reiser, M. Bech, F. Pfeiffer, "Grating-based X-ray Dark-field Computed Tomography of Living Mice," Ebiomedicine, vol 2, pp. 1500-1506, 2015.

[2] Andre Yaroshenko, Tina Pritzke, Markus Koschlig, Nona Kamgari, Konstantin Willer, Lukas Gromann, Sigrid Auweter, Katharina Hellbach, Maximilian Reiser, Oliver Eickelberg, Franz Pfeiffer and Anne Hilgendorff, "Visualization of neonatal lung injury associated with mechanical ventilation using X-ray dark-field radiography," Sci Rep. 2016; 6: 24269.

[3] Kai Scherer, Lorenz Birnbacher, Michael Chabior, Julia Herzen, Doris Mayr, Susanne Grandl, Anikó Sztrókay-Gaul, Karin Hellerhoff, Fabian Bamberg, Franz Pfeiffer, "Bi-directional X-ray Phase-Contrast Mammography," *PLoS ONE*, vol. 9, no. 5, e93502, May 2014.

[4] Z. Wang, N. Hauser, G. Singer, M. Trippel, R. A. Kubik-Huch, C. W. Schneider, M. Stampanoni, "Non-invasive classification of micro-calcifications with Phase-Contrast X-ray Mammography," *Nature Communications* vol. 5, no. 3797, May 2014.

[5] T. Koehler, H. Daerr, G. Martens, N. Kuhn, S. Löscher, U van Stevendaal, E, Roessl, "Slit-scanning differential X-ray phase-contrast mammography: Proof-of-concept experimental studies," *Med. Phys*. vol. 42, no. 4, pp. 1959-1965, April 2015.

[6] J. Tanaka, M. Nagashima, K. Kido, Y. Hoshino, J. Kiyohara, C. Makifuchi, S. Nishino, S. Nagatsuka, A. Momose, "Cadaveric and in vivo human joint imaging based on differential phase contrast by X-ray Talbot-Lau interferometry," *Z. Med. Phys*. vol. 23, pp. 222-227, 2013.

[7] D. Stutman, T. J. Beck, J. A. Carrino, and C. O. Bingham, "Talbot phase-contrast X-ray imaging for the small joints of the hand," *Phys Med Biol*. vol. 56, no. 17, pp. 5697-5720, 2011.

[8] H. Miao, A. A. Gomella, K. J. Harmon, E. E. Bennett, N. Chedid, S. Znati, A. Panna, B. A. Foster, P. Bhandarkar and H. Wen, "Enhancing Tabletop X-Ray Phase Contrast Imaging with Nano-Fabrication," *Scientific Reports*, vol. 5, No. 13581, August 2015 DOI: 10.1038/srep13581.

[9] H. Miao, A. Panna, A. A. Gomella, E. E. Bennett, S. Znati, L. Chen and H. Wen, "A universal moiré effect and application in X-ray phase-contrast imaging," *Nature Physics*, vol. 12, pp. 830-834, April 2016.

[10] A. Momose, "Recent Advances in X-ray Phase Imaging," Japanese Journal of Applied Physics, Vol. 44, No. 9A, 6355-6367, 2005.

[11] F. Pfeiffer, T. Weitkamp, O. Bunk and C. David, "Phase retrieval and differential phase-contrast imaging with low-brilliance X-ray sources," *Nature Physics* vol. 2, April 2006, (www.nature.com/naturephysics, published online: 26 Mar. 2006).

[12] J. Dey et al., LSU Disclosure LSU-2017-034, March 2017.

[13] *Introduction to Fourier Optics*, J. Goodman, McGraw Hill, 2$^{nd}$ Ed. 1988.

[14] *Principles of Optics*, M. Born and E. Wolf, Pergamon Press Ltd, 1970.

[15] S. Marathe, L. Assoufid, X. Xiao, K. Ham, W. W. Johnson, and L. G. Butler, "Improved Algorithm for Processing Grating-Based Phase Contrast Interferometry Image Sets," *Rev. Sci. Instrum*., vol. 85, no. 013704, 2014.

[16] H. Wen, C. K. Kemble, E. E. Bennett, "Theory of Oblique and Grazing Incidence Talbot-Lau Interferometers and Demonstration in a Compact Source X-ray Reflective Interferometer," *Optics Express*, vol. 19, no. 25, pp. 25093-25112, 2011.

Example 3

Phase contrast X-ray not only provides conventional tissue attenuation provided by regular X-ray and CT, it can provide images based on X-ray phase-shift and scatter (dark-field), within the same scan. Phase Contrast X-ray can identify lung disease where conventional X-ray fails [ex.

1-2]. Other areas poised to benefit greatly are mammography [3-5] and bone joint imaging (e.g., imaging arthritis) [6-7]. The two interferometry methods currently at the forefront are: Far-field Interferometry (Miao et al., *Nat. Phy.* 2015; Sci Rep 2015) [8-9]) and Talbot-Lau interferometry (Momose *JJAP* 2005, Pfeiffer Nature 2006 [10-11]). While Talbot Lau interferometry has made the most clinical stride [ex. 1-7], an absorption grating (analyzer) is needed to see interference patterns with standard cost-effective X-ray detectors, which is detrimental from dose consideration. Recently the far-field X-ray interferometry Miao et al. [8-9] eliminated the need for the analyzer by using two (or three) phase-gratings with slight differences in pitch between them to create a low-varying "beat-frequency." The ensuing moiré pattern fringes are directly visible (without analyzer grating) with a standard detector reducing dose 2-folds [9]. A most important feature of the far-field interferometer is that it accesses 2 to 3-folds better range of scatter than Talbot-Lau. The ~400 nm pitch of the phase grating makes Miao et al. [8-9] system a far-field system rather than near-field system like the Talbot-Lau [10-11]. One drawback is that the 2-3 phase-gratings in [8-9] have to be aligned and placed at fine-tuned distances to obtain fringe patterns. Also the source-to-detector distances are 1.7-2 m for the Miao et al systems [8-9].

Described herein is a clinically practical near-field system that uses a single phase grating. This achieves similar results as Miao et al [8] and is also compact. Initial linear-quadratic gratings were presented in [12]. Herein, a slow rectangular pattern superposed on a linear-grating is presented. This simpler grating is easier to manufacture. Moreover, mono-directional grating phase contrast imaging cannot be isotropic in sensitivity at every direction to diagnose high oriented tissue structures, like fine tumor branches of invasive ductal carcinoma. Typically, bi-directional (90° rotation of mono-directional grating) acquisitions are applied accordingly to obtain phase information in two orthogonal directions [3]. To acquire phase contrast imaging with isotropic sensitivity in a single shot, a two-dimensional structured grating is also described herein. In this work, both one-dimensional and bi-directional gratings are simulated using Sommerfeld-Rayleigh equations [13-14] to show feasible systems with strong discernable fringes 50 mm away from gratings.

Figure 15:
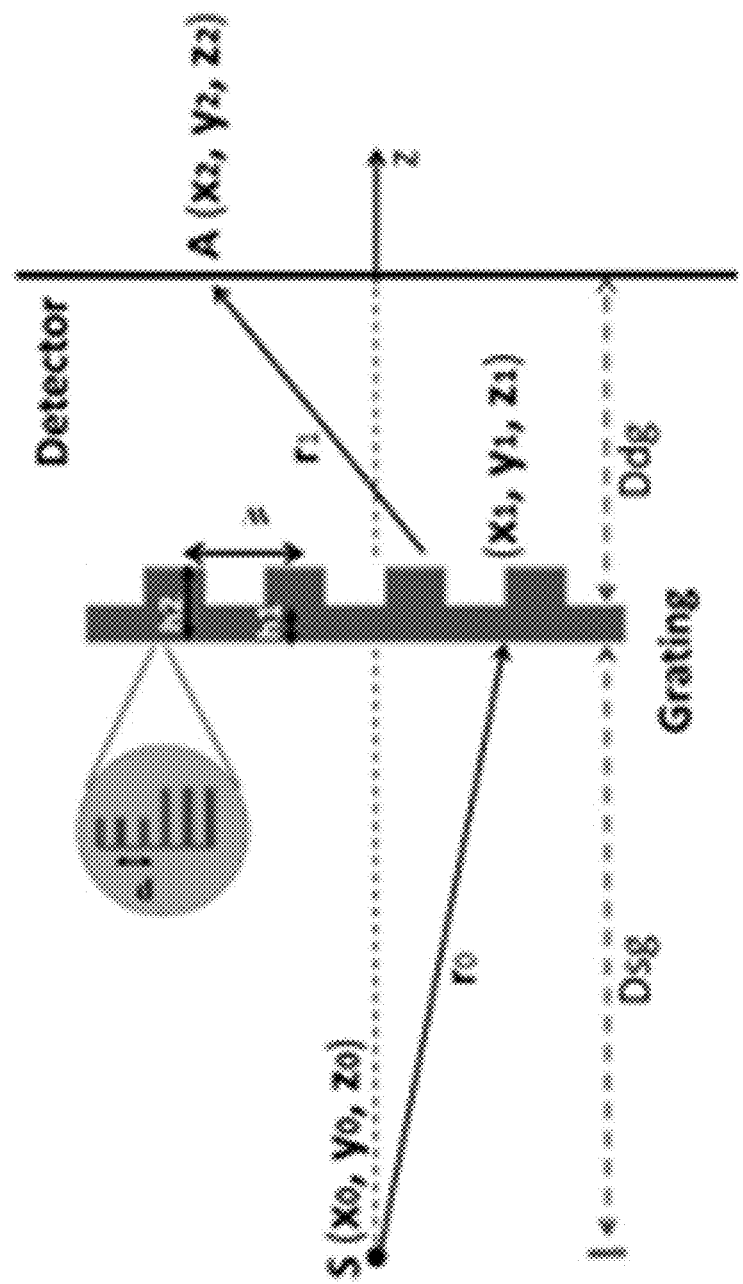
FIG. 15 shows a system diagram including a detector, a grating, and a source.
Figures 16A, 16B:
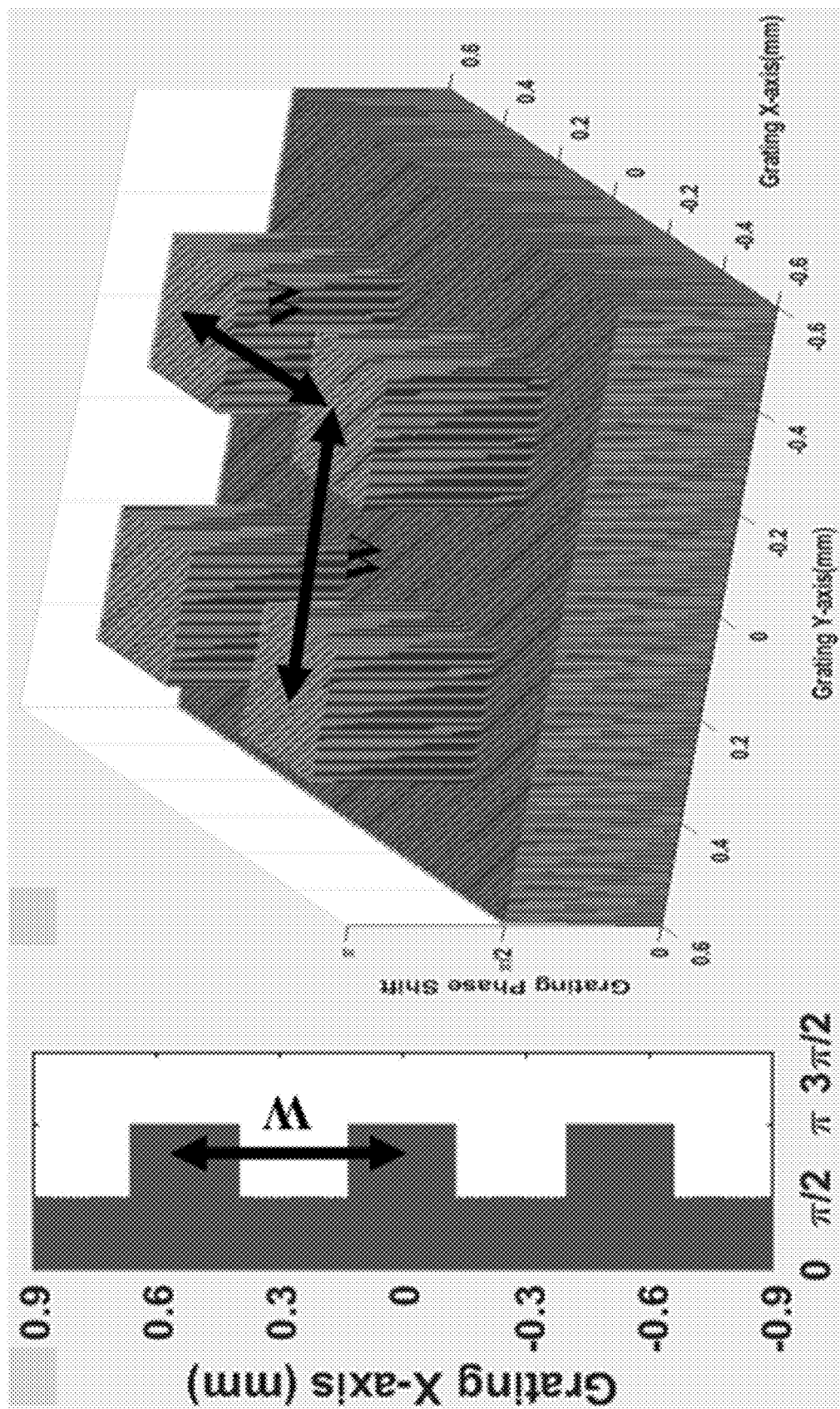
FIG. 16A shows a one dimensional rectangular structured grating.
FIG. 16B shows a two directional grating.

A grating is disclosed herein with a slow-varying function (rectangular in this instance) of repeating phase-dependence superposed on the grating pattern. Such a function maybe achieved by gradually changing the spatial height of the grating. This will create sampling patterns or fringes with the spacing required to image with standard CT/X-ray detector resolution. A system shown in FIGS. 15, 16A, and 16B is simulated. The rectangular grating structures are shown in FIGS. 16A and 16B. FIG. 16A shows the one-dimensional case and FIG. 16B shows the two-directional case. Each rectangle has a grating pattern 800 nm pitch and 50% duty-cycle. The 800 nm pitch of the grating pattern makes this a near-field system. The period of interference fringes (peak-to-peak width) can be adjusted by varying periodicity (peak-to-peak width W) of rectangular units in grating. The reference amplitude at detector is obtained by evaluating the Sommerfeld-Rayleigh [13-14] integral given by, $$G(x, y, z) = T_G(x, y, z) \cdot e^{-i\varphi_r(x,y,z)} \quad (3.1)$$

$$A(x_2, y_2, z_2) = \quad (3.2)$$
$$\frac{1}{i\lambda} \int\int\int U(P_S) \cdot \frac{e^{-ikr_0}}{r_0} \cdot G(x_1, y_1, z_1) \cdot \frac{e^{-ikr_1}}{r_1} \cdot (r_0 \cdot r_1) dx_1 dy_1 dz_z$$

and the intensity is $I(x_2,y_2,z_2)=|A(x_2,y_2,z_2)|^2 \quad (3.3)$ where $U(P_s)$ is the source, assumed as a parallel beam of X-ray. The grating-to-detector distance was 50 mm. The design energy used was 17.5 keV. To evaluate the intensity, the grating function $G(x_1, y_1, z_1)$ is sampled at 1 nm and the detector is sampled at 1 μm. Interference patterns are simulated for a range of height pairs ($h_1$, $h_2$) corresponding to phase-shifts ($\pi/4$, $\pi/2$) to ($\pi/2$, $\pi$).

To image an object with this system, the interference pattern has to be imaged single shot with and without object or multiple exposures for phase-stepping methods [15]. Direct Fourier method [16] can use used for the single-shot acquisition (with and without object) to obtain the phase of the object. The shape, spacing, and maximum-height can be varied to provide compact designs with control over the fringe contrast over different detector distances. For instance, the rectangular unit can also be replaced by quadratic (paraboloid) shape superposed on a linear structure. Certainly, the linear-rectangular grating is easier in manufacture.

Figure 17A:
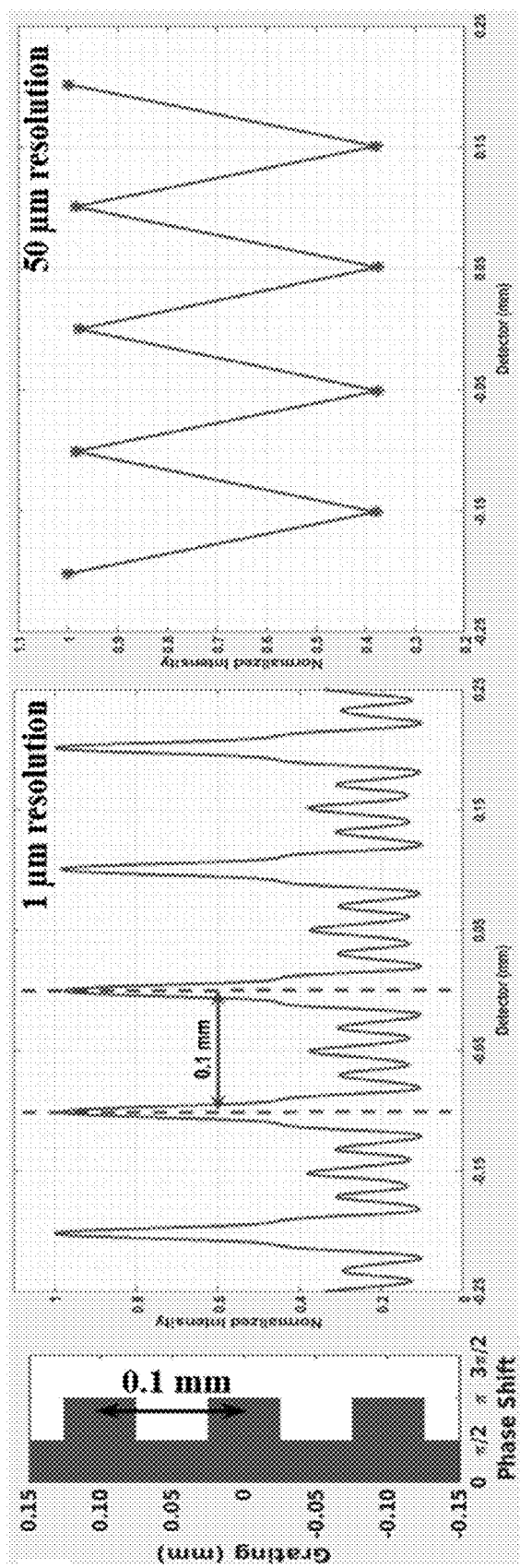
FIG. 17A shows, from left to right, a grating, interference pattern in 1 μm detector resolution, and interference pattern in 50 μm resolution. The system has 0.1 mm periodicity of rectangular unit grating at 50 mm grating-to-detector distance.
Figure 17B:
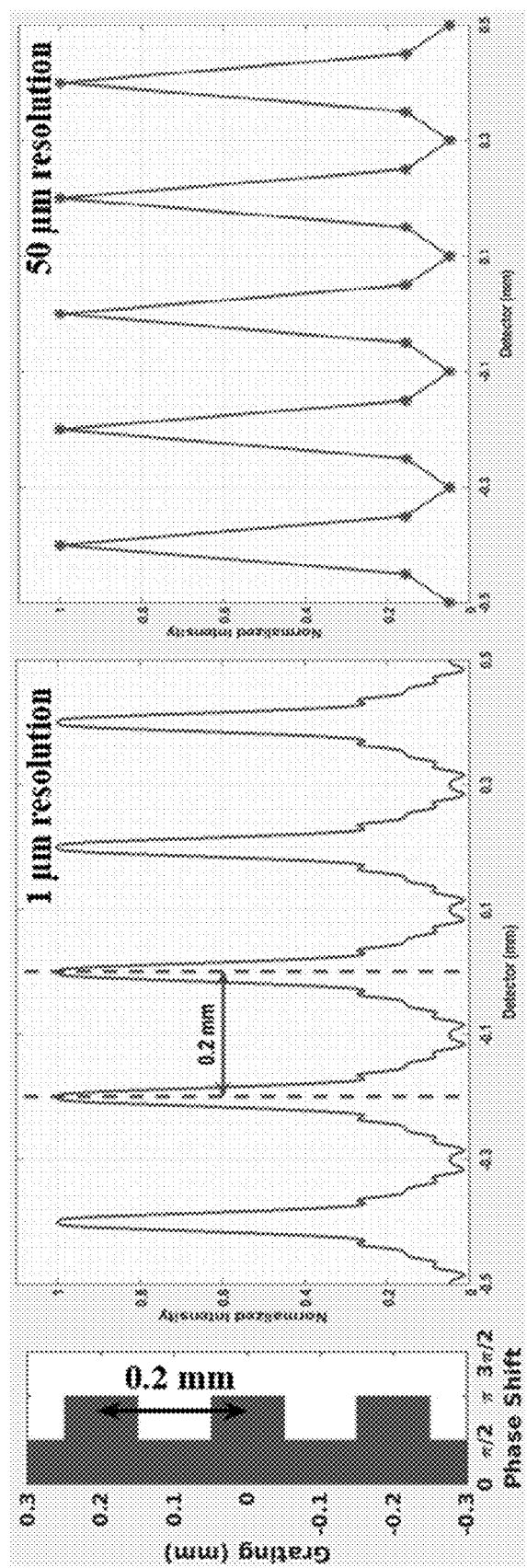
FIG. 17B shows, from left to right, a grating, interference pattern in 1 μm detector resolution, and interference pattern in 50 μm resolution. The system has 0.2 mm periodicity of rectangular unit grating at 50 mm grating-to-detector distance.

The results of the detector simulation for one dimensional linear-rectangular structured grating case are shown in FIGS. 17A and 17B. FIG. 17A shows an interference pattern of 100 μm rectangular unit period in grating with 1 μm and 50 μm resolution at 50 mm grating-to-detector distance. The peak-to-peak width of interference fringes is 100 μm. FIG. 17B shows an interference pattern of 200 μm rectangular unit period in grating with 1 μm and 50 m resolution at 50 mm grating-to-detector distance. The peak-to-peak width of interference fringes is 200 μm.

Figures 18A, 18B:
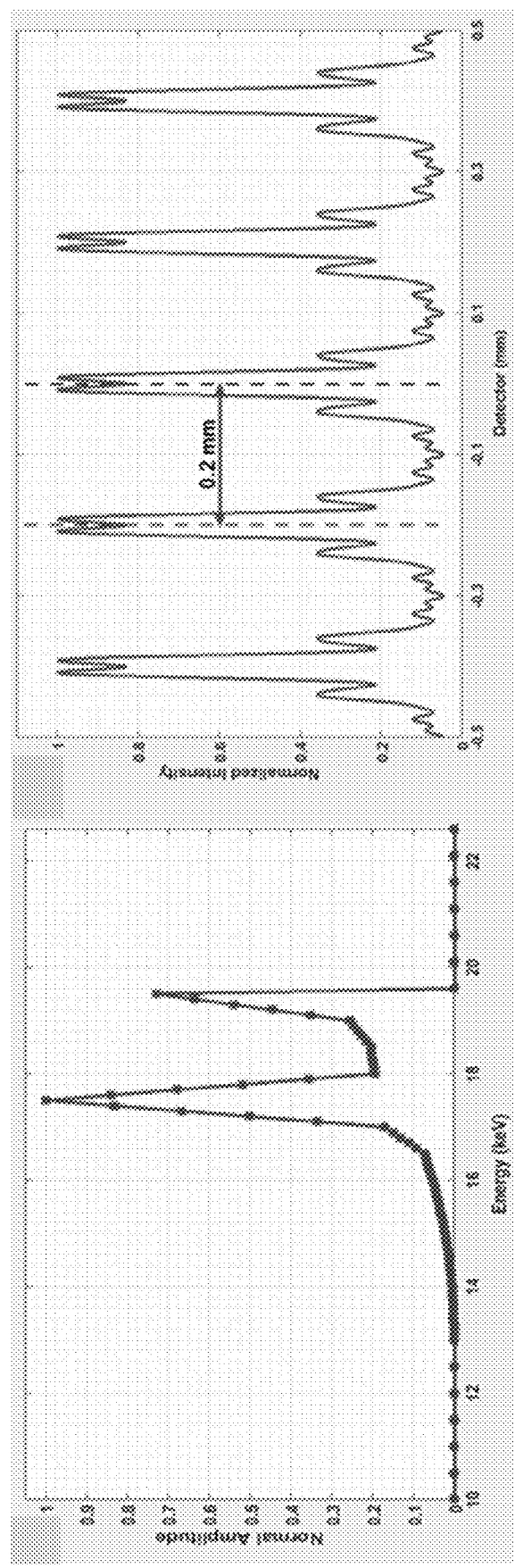
FIG. 18A shows a mammography X-ray source spectrum.
FIG. 18B shows an inference pattern of spectrum in 1 μm resolution at 50 mm grating-to-detector distance for a grating with 200 μm rectangular unit period.

Moreover, X-ray sources in clinical applications generate continuous energy spectrums rather than monoenergetic output. To clarify the effect of partially losing longitudinal coherence to interference patterns, a simulation is accomplished of a linear-rectangular grating in 200 μm unit period with an X-ray spectrum used in mammography. For simplicity a parallel beam approximation is used. FIG. 18A shows the X-ray spectrum generated with 30 kV peak tube voltage, molybdenum anode and 0.2 mm thickness molybdenum filter (by Siemens Healthcare Simulation of X-ray Spectra online tool). The corresponding simulation results of interference pattern is showed in FIG. 18B with 1 μm resolution at 50 mm grating-to-detector distance.

Figures 19A, 19B:
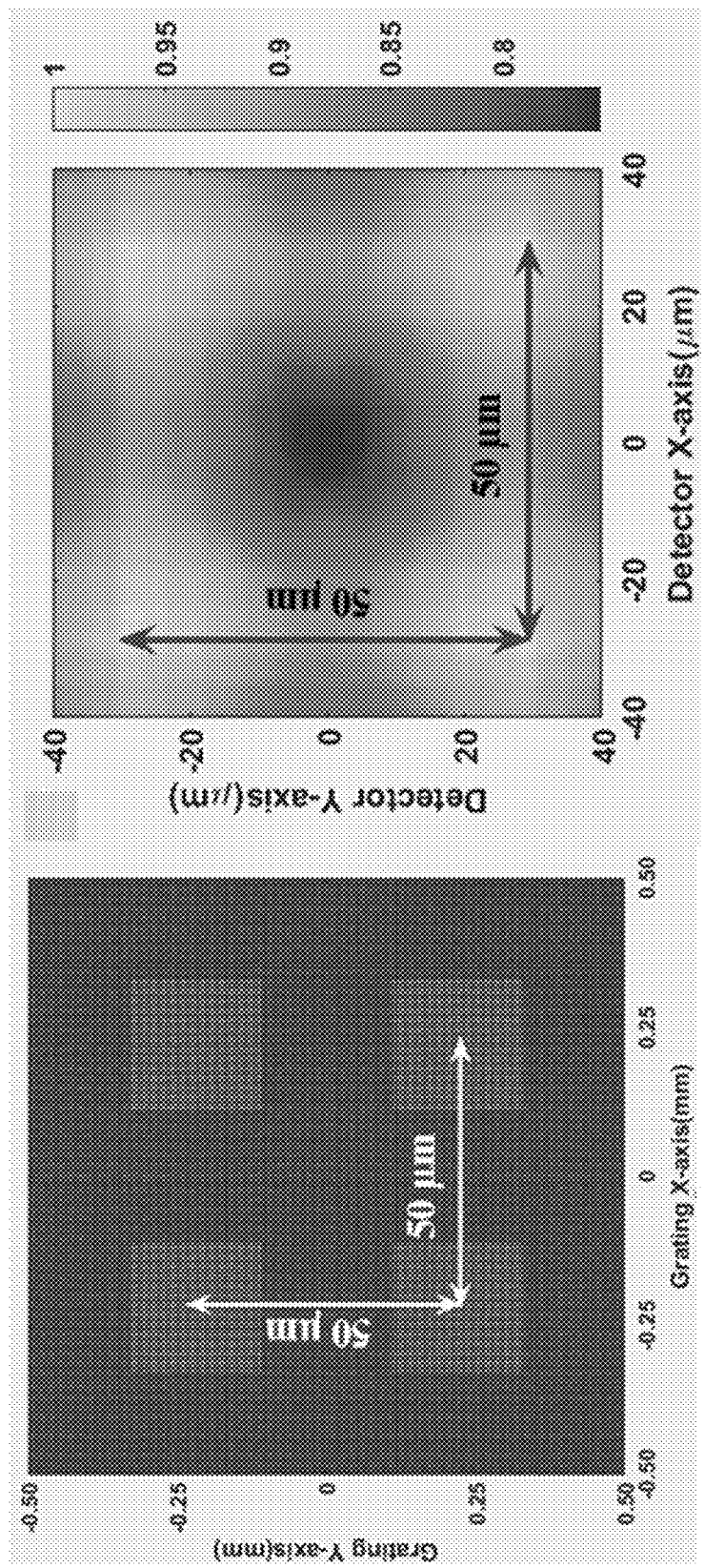
FIG. 19A shows a two directional grating with 50 μm periodicity of rectangular-unit.
FIG. 19B shows a two-dimensional interference pattern at 50 mm grating-to-detector distance.

The simulation results of two-directional rectangular-linear grating are showed in FIGS. 19A and 19B. FIG. 19A shows the plan view of the grating with both 50 m periodicity of rectangular unit in X and Y directions. FIG. 19B shows the two-dimensional interference pattern with 50 mm grating-to-detector distance. The fringes still keep 50 μm peak-to-peak width, which means for the rectangular-linear structured phase grating in two directional case, the interference pattern is also controlled and adjustable like one-dimensional cases.

The design disclosed herein exceeds the performance of the one of the best systems, Miao et al. far-field system [8,9]. In one X-ray optic functionality is accomplished that requires 2-3 optics in their design. The system disclosed herein has more control over the fringe contrast at compact detector distances and can be fine-tuned to different applications by changing the shape, spacing and maximum-height of the gratings. All the benefits of Miao et al. far-field system of not requiring analyzer over Talbot-Lau interferometers are retained.

A feasible and compact phase contrast X-ray system is shown with a two-dimensional single phase-grating, requiring no analyzer. The design uses a single grating instead of a 2-3 phase gratings in one of the current best systems, Miao et al. The system disclosed herein retains all the advantages of a far-field system—(a) requiring no analyzer unlike the Talbot-Lau system [10,11]; this will reduce dose by a factor of ~2 and (b) the system disclosed herein provides compact designs with more control over the fringe contrast at different detector distances.

REFERENCES FOR EXAMPLE 3

[1] A. Velroyen A. Yaroshenko, D. Hahn, A. Fehringer, A. Tapfer, M. Miller, P. B. Noël, B. Pauwels, A Sasov, A. Ö. Yildirim, O. Eickelberg, K. Hellbach, S. D. Auweter, F. G. Meinel, M. F. Reiser, M. Bech, F. Pfeiffer, *Ebiomedicine*, vol 2, 2015.
[2] A. Yaroshenko, T. Pritzke, M. Koschlig, N. Kamgari, K. Willer, L. Gromann, S. Auweter, K. Hellbach, M. Reiser, O. Eickelberg, F. Pfeiffer et al., *Sci Rep*, vol. 6 2016.
[3] K. Scherer, L. Birnbacher, M. Chabior, J. Herzen, D. Mayr, S. Grandl, A. Sztrókay-Gaul, K. Hellerhoff, F. Bamberg, F. Pfeiffer, *PLoS ONE*, vol. 9, no. 5, e93502, May 2014.
[4] Z. Wang, N. Hauser, G. Singer, M. Trippel, R. A. Kubik-Huch, C. W. Schneider, M. Stampanoni, *Nature Communications*, vol. 5, no. 3797, May 2014.
[5] T. Koehler, H. Daerr, G. Martens, N. Kuhn, S. Löscher, U. Stevendaal, E. Roessl, *Med. Phys.* vol. 42 no. 4, pp. 1959-1965, April 2015.
[6] J. Tanaka, M. Nagashima, K. Kido, Y. Hoshino, J. Kiyohara, C. Makifuchi, S. Nishino, S. Nagatsuka, A. Momose, *Z. Med. Phys.* vol. 23, pp. 222-227, 2013.
[7] D. Stutman, T. J. Beck, J. A. Carrino, and C. O. Bingham, *Phys Med Biol.* vol. 56, no. 17, pp. 5697-5720, 2011.
[8] H. Miao, A. Panna, A. A. Gomella, E. E. Bennett, S. Znati, L. Chen and H. Wen, *Nature Physics*, vol. 12, pp. 830-834, April 2016.
[9] H. Miao, A. A. Gomella, K. J. Harmon, E. E. Bennett, N. Chedid, S. Znati, A. Panna, B. A. Foster, P. Bhandarkar and H. Wen, *Scientific Reports*, vol. 5, No. 13581, August 2015.
[10] A. Momose, *Japanese Journal of Applied Physics*, vol. 44, no. 9A, pp. 6355-6367, 2005.
[11] F. Pfeiffer, T. Weitkamp, O. Bunk and C. David, *Nature Physics*, vol. 2, April 2006, (www.nature.com/naturephysics, published online: 26 Mar. 2006).
[12] J. Dey, J. Xu, K. Ham, N. Bhusal, V. Singh, "A Novel Phase Contrast System," presentation, IEEE NSS-MIC, October 2017 (oral).
[13] J. Goodman, "Introduction to Fourier Optics," McGraw Hill, $2^{nd}$ Ed. 1988.
[14] M. Born and E. Wolf, "Principles of Optics," Pergamon Press Ltd, 1970.
[15] S. Marathe, L. Assoufid, X. Xiao, K. Ham, W. W. Johnson, and L. G. Butler, *Rev Sci Instrum*, vol. 85, no. 013704, 2014.
[16] N. Bevins, J. Zambelli, K. Li, Z. Qi, G-H Chen, Med Physics, vol. 39, no. 1, pp. 424-428, 2012.

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:
1. A phase contrast X-ray imaging system comprising:
   an illumination source adapted to illuminate a region of interest;
   a diffraction grating adapted to receive illumination from the illuminated region of interest, the diffraction grating comprising a spatial structure having a first periodicity superimposed with a second periodicity that is different from the first periodicity; and
   a detector adapted to detect illumination passing through the diffraction grating,
   wherein the spatial structure is defined by varying height and/or pitch, and
   wherein the spatial structure imparts a first phase dependence based on the first periodicity and an additional phase dependence based on the second periodicity on the illumination passing through the diffraction grating.
2. The phase contrast X-ray imaging system according to claim 1, wherein the diffraction grating imparts a position-dependent quadratic phase, wherein the position-dependent quadratic phase is proportional to a square of a transverse distance from a pre-determined position on the diffraction grating in a first dimension.
3. The phase contrast X-ray imaging system according to claim 1, wherein the diffraction grating imparts a position-dependent quadratic phase, wherein the position-dependent quadratic phase is proportional to a square of a transverse distance from a pre-determined position on the diffraction grating in a first dimension and in a second dimension.
4. The phase contrast X-ray imaging system according to claim 1, wherein the grating imparts a position-dependent spherical phase.
5. The phase contrast X-ray imaging system according to claim 1, wherein the diffraction grating includes a plurality of grating elements, wherein the grating elements have a varying pitch that imparts the additional phase dependence on the illumination passing through the diffraction grating.
6. The phase contrast X-ray imaging system according to claim 1, wherein the diffraction grating contains a plurality of grating elements, wherein the grating elements have a varying pitch and a varying height, wherein the varying pitch and the varying height impart the additional phase dependence on the illumination passing through the diffraction grating.
7. The phase contrast X-ray imaging system according to claim 1, wherein the system does not include an absorption grating.
8. The phase contrast X-ray imaging system according to claim 1, wherein the illumination passes through a single grating before being detected by the detector.
9. The phase contrast X-ray imaging system according to claim 1, wherein the detector is curved.
10. The phase contrast X-ray imaging system according to claim 1, wherein the diffraction grating has a circular support, and wherein the phase contrast X-ray imaging system is used to perform single-shot dark-field imaging.

11. The phase contrast X-ray imaging system according to claim 1, further comprising a display device configured to display an image of the region of interest using the detected illumination.

12. A grating for performing phase contrast X-ray imaging, comprising:
- a support structure; and
- a plurality of grating elements arranged to receive an X-ray beam therethrough,
- wherein the grating is adapted to change the phase of the X-ray beam in a quadratic or spherical-cap form, and
- wherein each of the plurality of grating elements has a transverse width of about 0.5 mm to about 2 mm, and wherein a height of the plurality of grating elements varies from a height corresponding to a 0 phase shift to a height corresponding to a $\pi/2$ phase shift of the X-ray beam.

13. A grating for performing phase contrast X-ray imaging, comprising:
- a support structure; and
- a plurality of grating elements arranged to receive an X-ray beam therethrough,
- wherein the grating is adapted to change the phase of the X-ray beam in a quadratic or spherical-cap form, and
- wherein each of the plurality of grating elements has a transverse width of about 0.5 mm to about 2 mm, and wherein a height of the plurality of grating elements varies from a height corresponding to a 0 phase shift to a height corresponding to a $\pi$ phase shift of the X-ray beam.

* * * * *